United States Patent
Wagner

(10) Patent No.: US 6,199,455 B1
(45) Date of Patent: Mar. 13, 2001

(54) DRIVER, FASTENER AND FORMING TOOL

(75) Inventor: John B. Wagner, Alamo, CA (US)

(73) Assignee: JJCT Enterprises, Inc., Folsom, CA (US)

( * ) Notice: Subject to any disclaimer, the term of this patent is extended or adjusted under 35 U.S.C. 154(b) by 0 days.

(21) Appl. No.: 09/264,480

(22) Filed: Mar. 8, 1999

(51) Int. Cl.$^7$ .................................................. B25B 13/06
(52) U.S. Cl. ............................. 81/121.1; 81/460; 81/186; 81/436
(58) Field of Search ................................. 81/121.1, 460, 81/461, 436, 441, 186

(56) References Cited

U.S. PATENT DOCUMENTS

| | | |
|---|---|---|
| Re. 24,878 | 9/1960 | Smith et al. . |
| 975,285 | 11/1910 | Robertson . |
| 1,080,707 | 12/1913 | Mackie . |
| 2,046,837 | 7/1936 | Phillips . |
| 2,058,197 | 10/1936 | West . |
| 2,082,748 | 6/1937 | Brown . |
| 2,173,707 * | 9/1939 | Brown ................................. 81/121.1 |
| 2,216,382 | 10/1940 | West et al. . |
| 2,445,978 | 7/1948 | Stellin . |
| 2,592,462 | 4/1952 | Phipard, Jr. . |
| 2,601,453 | 6/1952 | Phipard, Jr. . |
| 2,764,197 | 9/1956 | Torrensen . |
| 2,800,829 | 7/1957 | West . |
| 2,847,894 | 8/1958 | Smith et al. . |
| 2,848,024 | 8/1958 | Smith et al. . |
| 3,170,364 | 2/1965 | Johnson et al. . |
| 3,177,755 | 4/1965 | Kahn . |
| 3,237,506 | 3/1966 | Muenchinger . |
| 3,293,978 | 12/1966 | Handley . |
| 3,888,144 | 6/1975 | Parsons . |
| 3,985,170 * | 10/1976 | Iskra ..................................... 81/121.1 |
| 4,084,478 | 4/1978 | Simmons . |
| 4,089,357 | 5/1978 | Gill . |
| 4,202,244 | 5/1980 | Gutshall . |
| 4,338,835 | 7/1982 | Simons . |
| 4,355,552 | 10/1982 | Gutshall . |
| 4,464,957 * | 8/1984 | Gill ....................................... 81/461 |
| 5,020,954 | 6/1991 | Dreger . |
| 5,171,117 | 12/1992 | Seidl . |
| 5,199,839 | 4/1993 | DeHaitre . |
| 5,207,132 | 5/1993 | Goss et al. . |
| 5,214,987 * | 6/1993 | Fenton, Sr. ............................. 81/460 |
| 5,279,190 | 1/1994 | Goss et al. . |
| 5,302,068 | 4/1994 | Janusz et al. . |
| 5,366,330 | 11/1994 | Cosenza . |
| 5,461,952 * | 10/1995 | Goss ..................................... 81/460 |
| 5,509,334 | 4/1996 | Shinjo . |
| 5,516,248 | 5/1996 | DeHaitre . |
| 5,531,143 | 7/1996 | Habermehl . |
| 5,553,983 | 9/1996 | Shinjo . |
| 5,683,217 | 11/1997 | Walther . |

* cited by examiner

Primary Examiner—James G. Smith
Assistant Examiner—Lee Wilson
(74) Attorney, Agent, or Firm—James R. Cypher; Charles R. Cypher

(57) ABSTRACT

A torque transmitting or coupling arrangement for a fastener drive system or the like, wherein the respective externally configured and internally configured components include a body having an axis in which the body has a modified polygonal cross section defined by a perimeter wall. A polygonal central portion positioned within the perimeter wall has an area less than the area of the modified polygonal cross section. A drive wall which forms a portion of the perimeter wall extends on a plane from a proximal end outwardly from the polygonal central portion to a distal end. A first outer wall forming another portion of the perimeter wall has a proximal end joining the distal end of the drive wall at an angle and a distal end terminating on the perimeter wall. The system includes a fastener driver, a threaded fastener and a forming tool for forming a recess in the fastener.

24 Claims, 14 Drawing Sheets

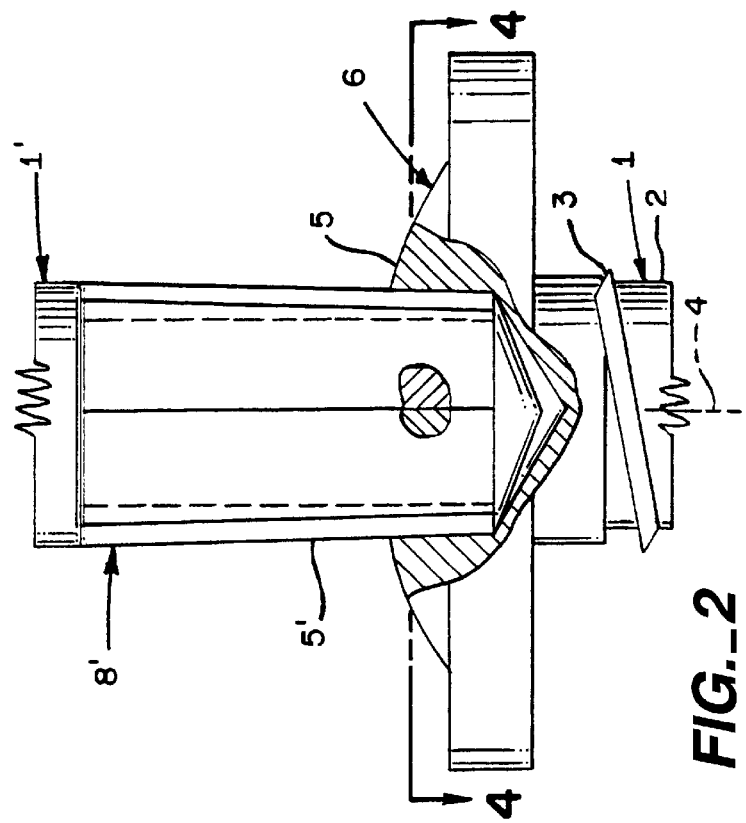
FIG._2
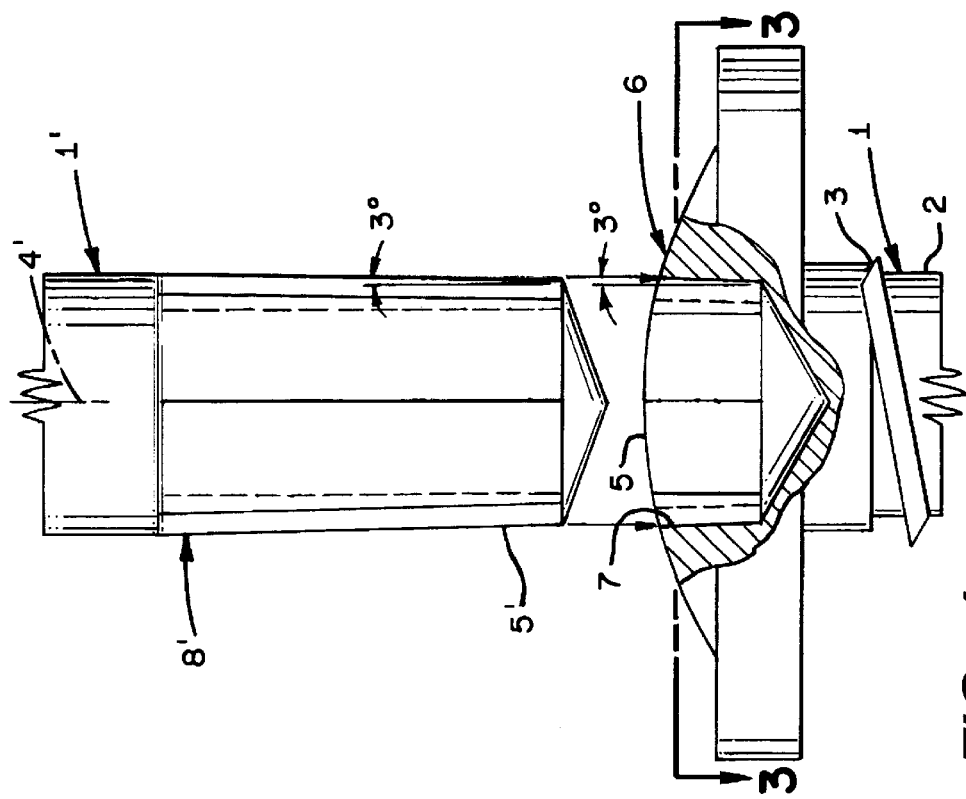
FIG._1

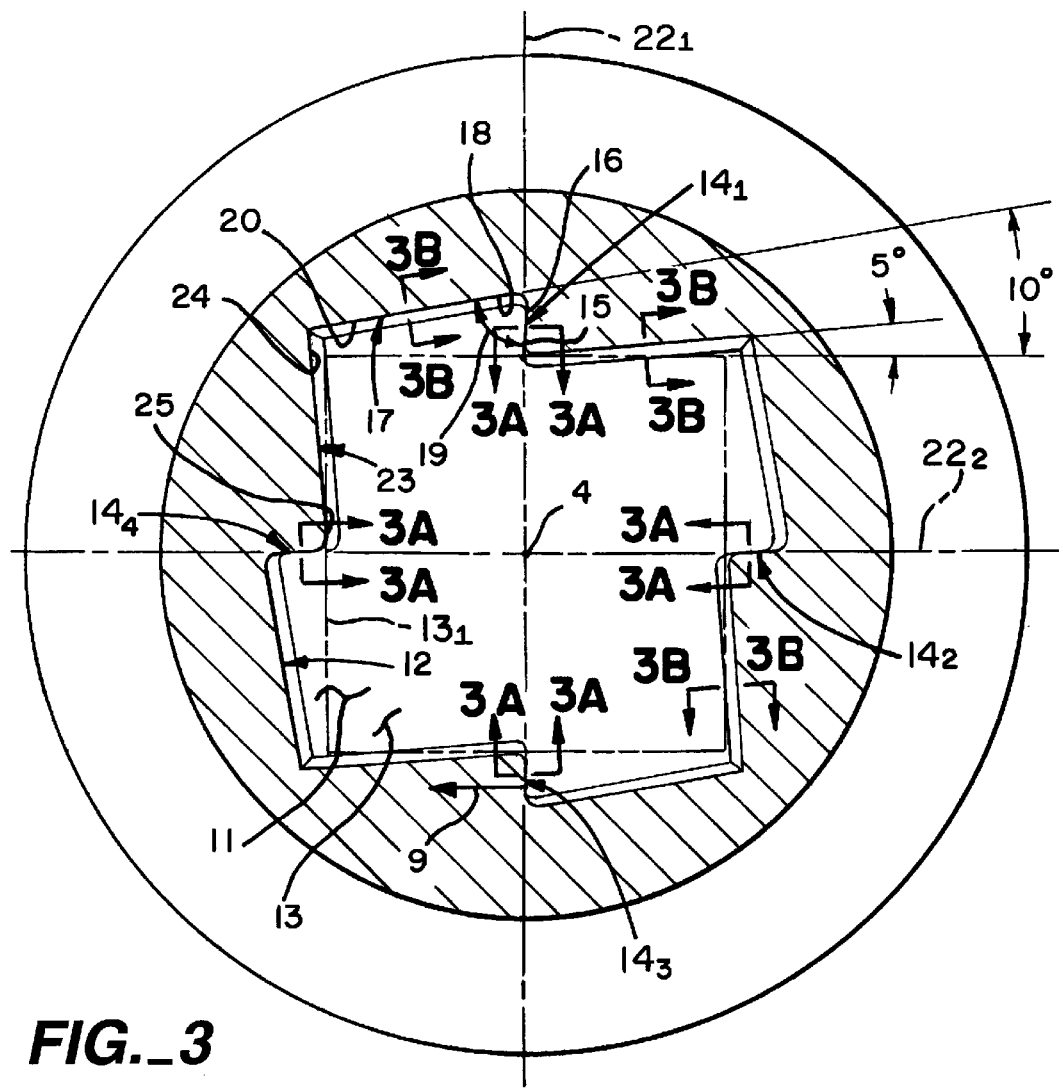
FIG._3
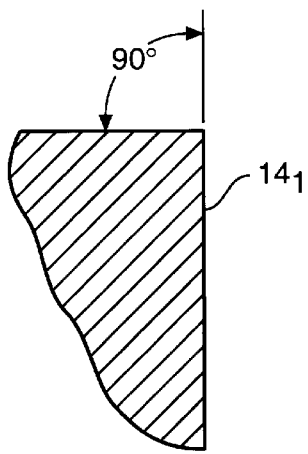
FIG._3A
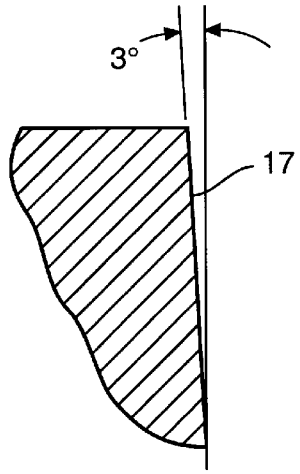
FIG._3B

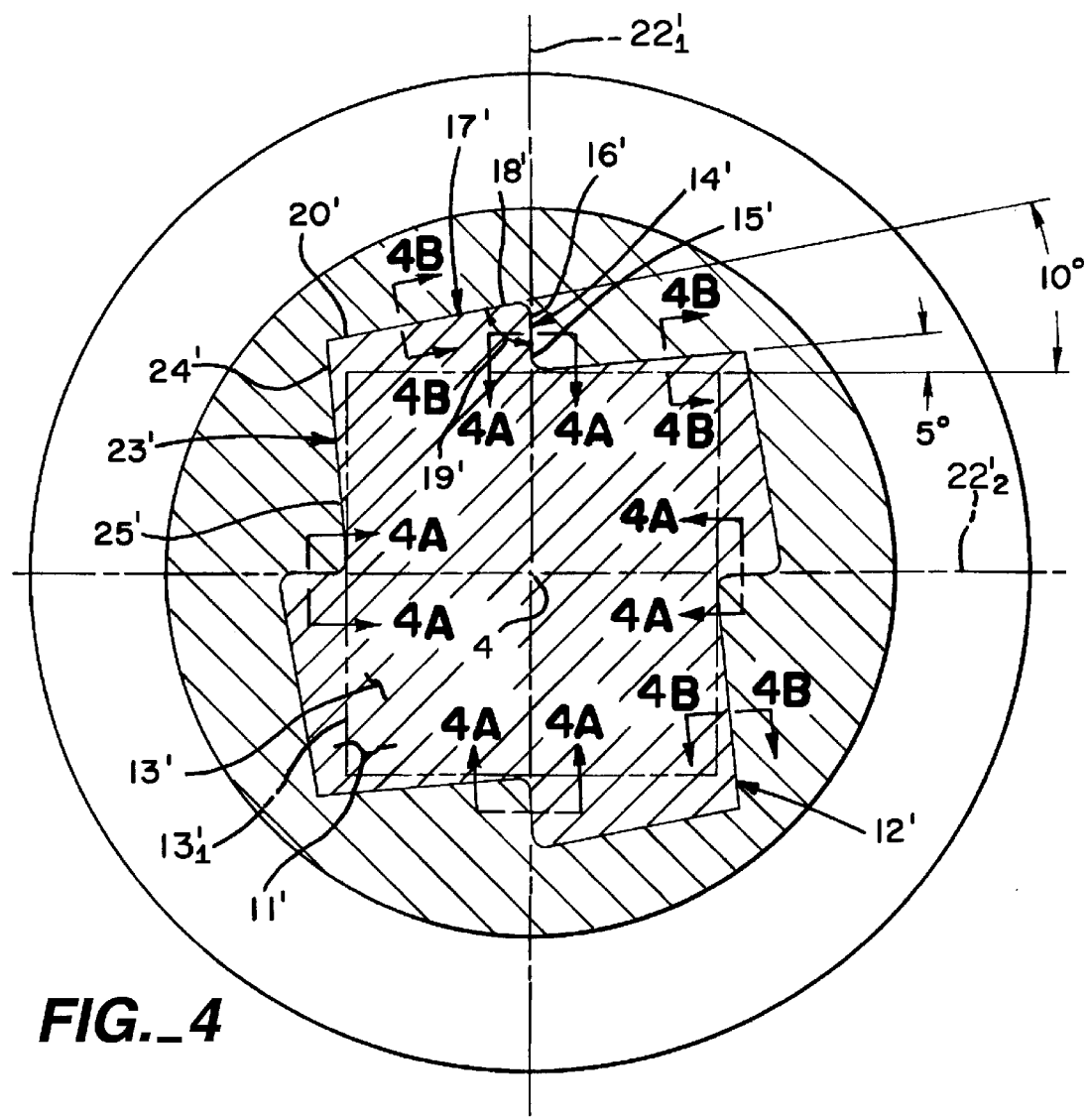
FIG._4
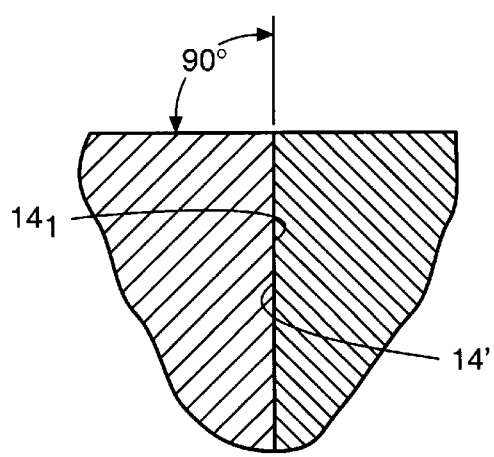
FIG._4A
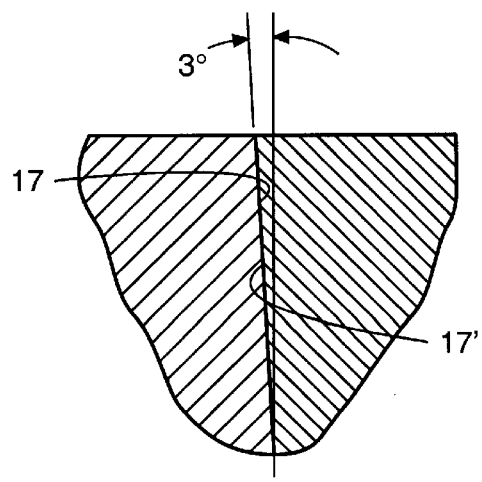
FIG._4B

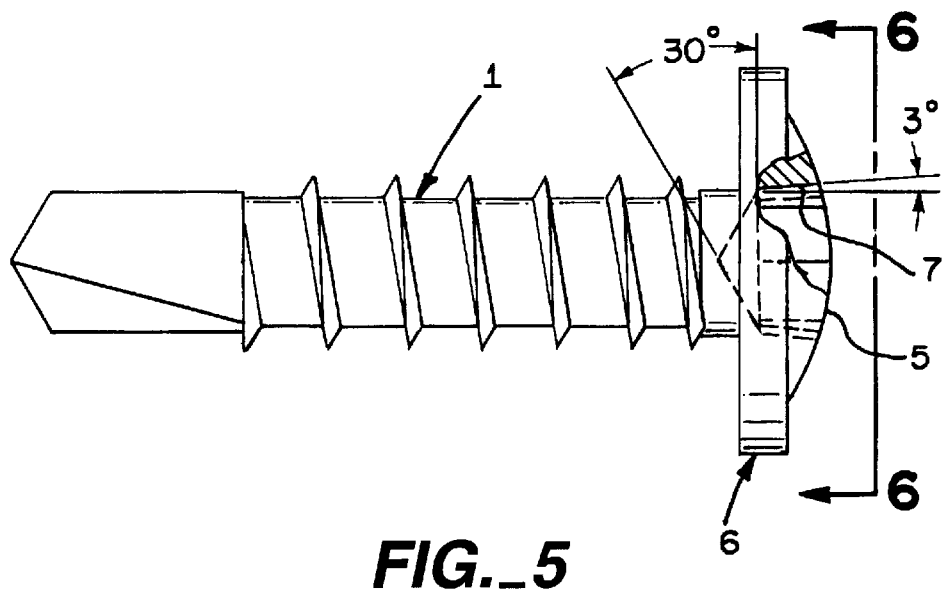
FIG._5
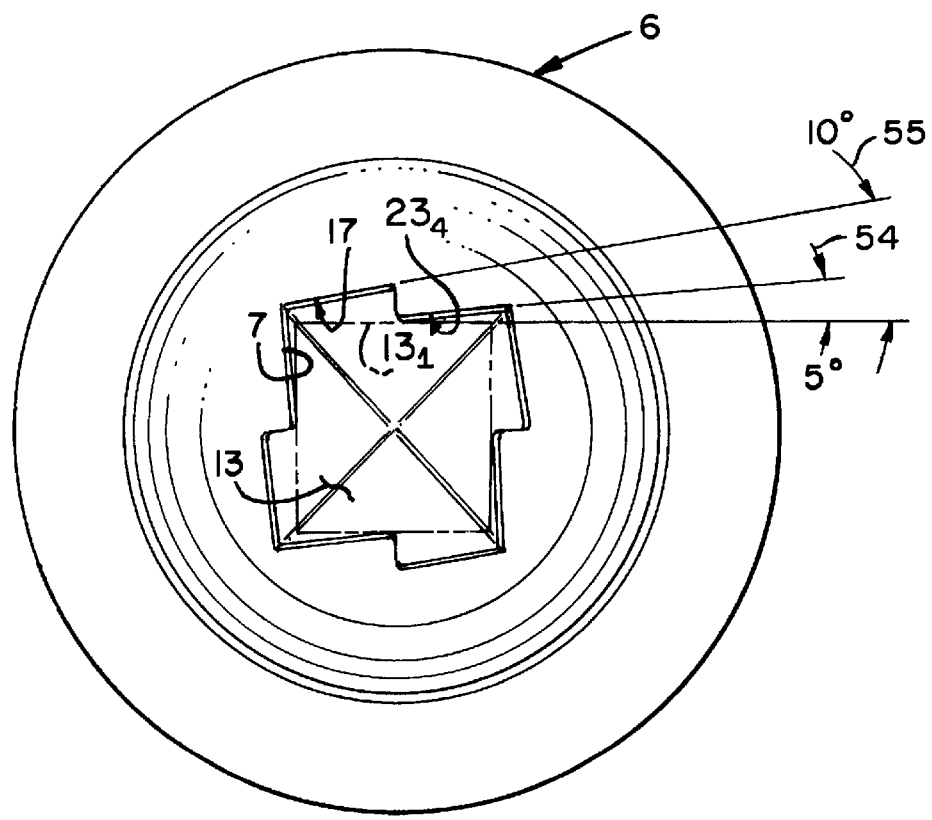
FIG._6

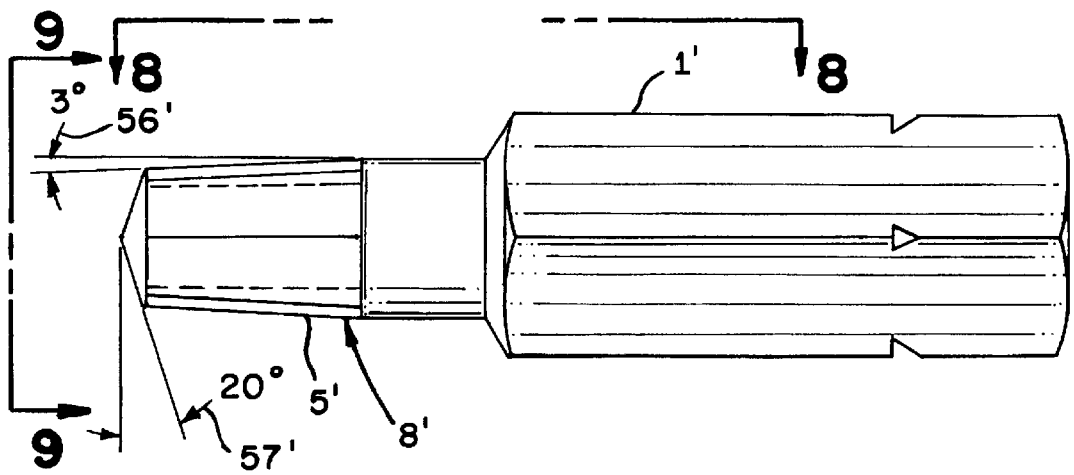
FIG._7
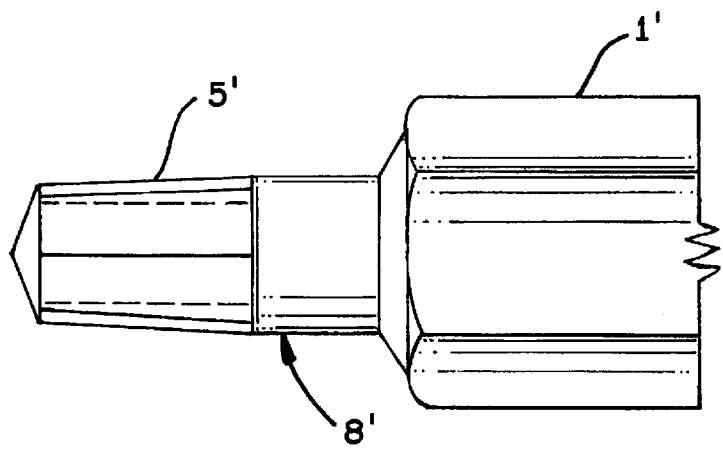
FIG._8
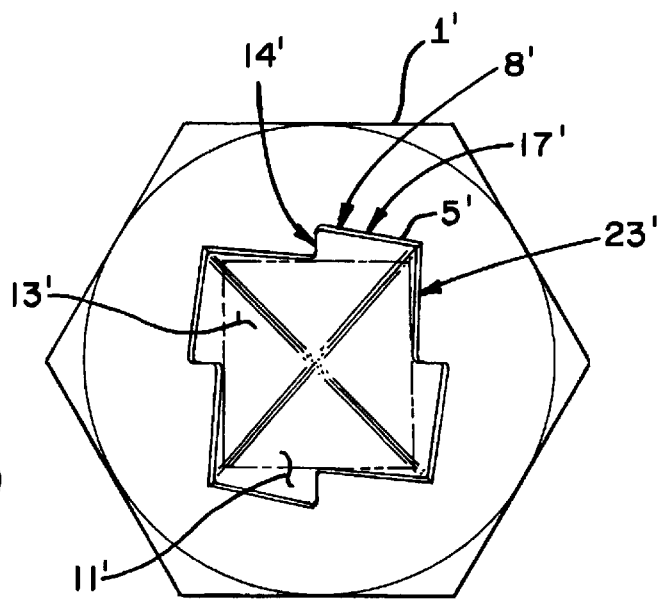
FIG._9

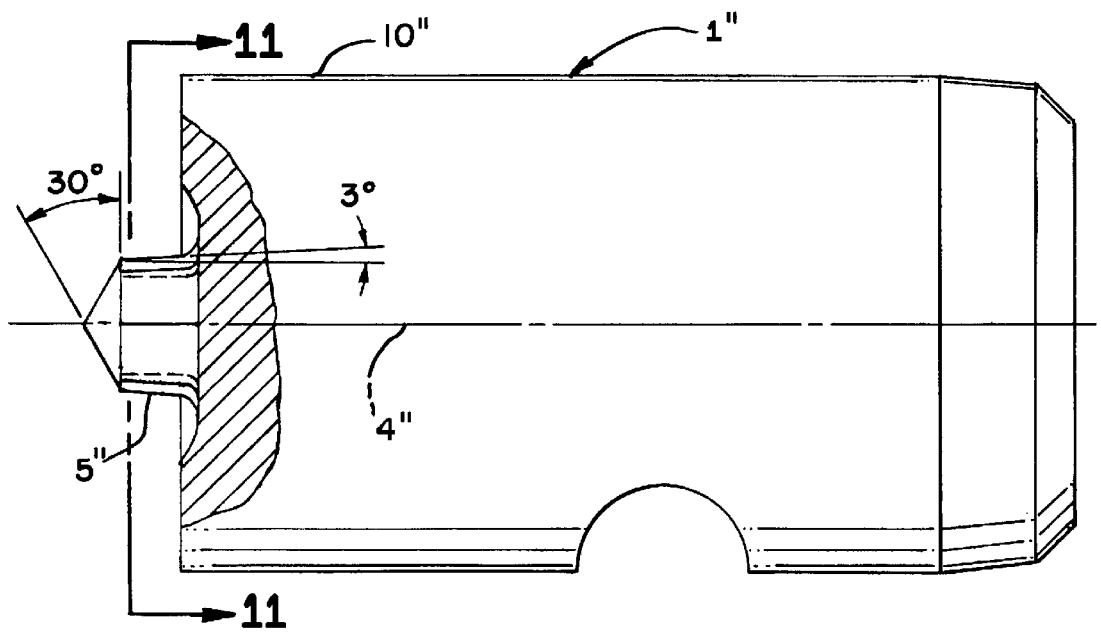
FIG._10
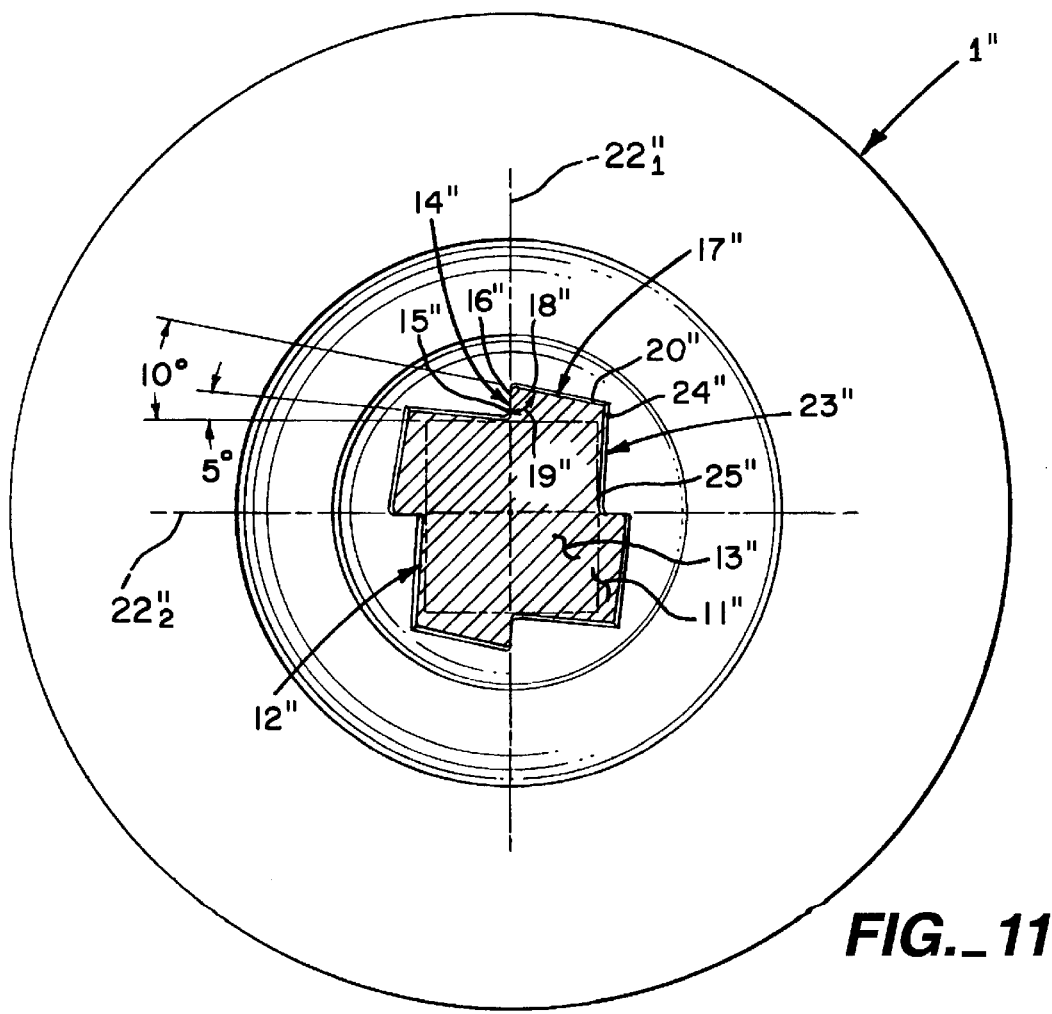
FIG._11

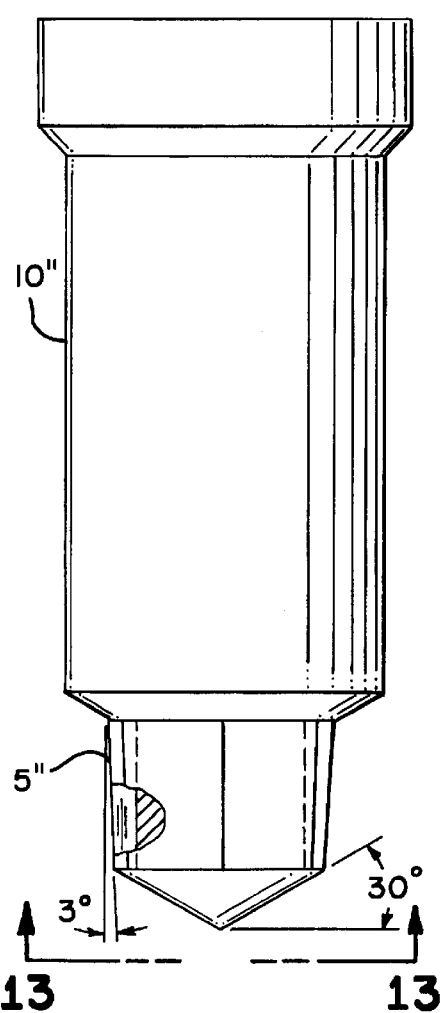
FIG._12
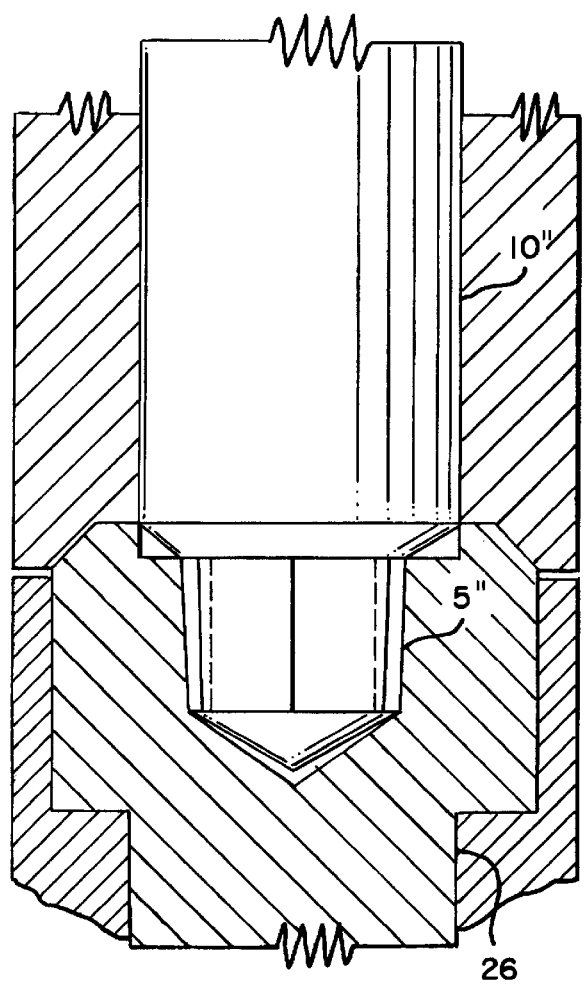
FIG._14
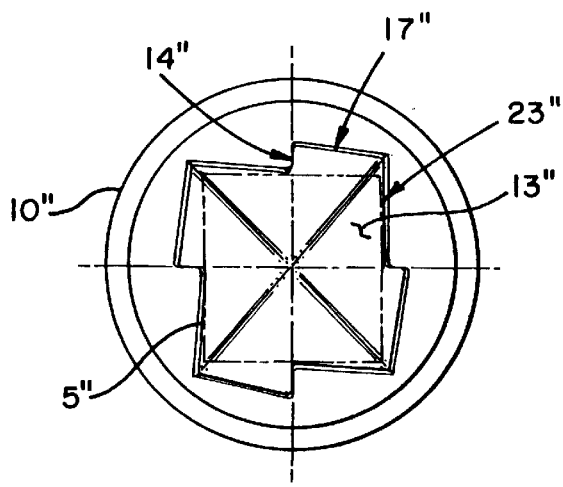
FIG._13

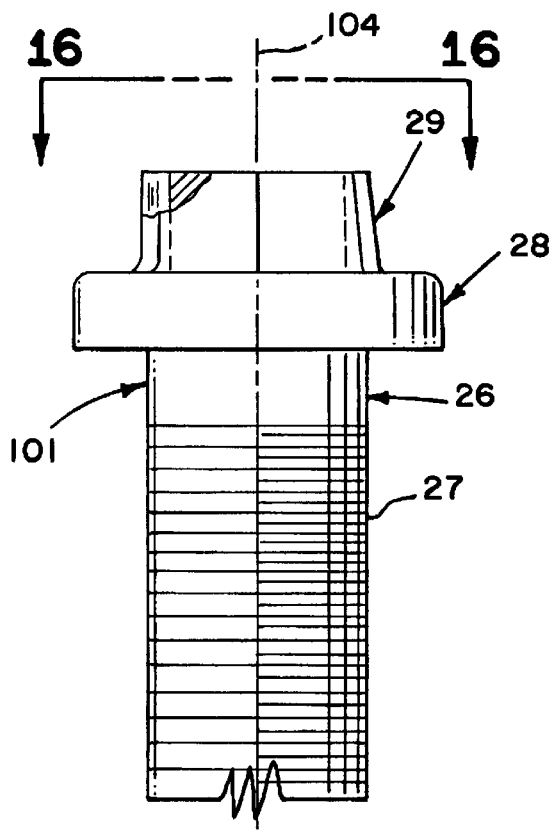
FIG._15
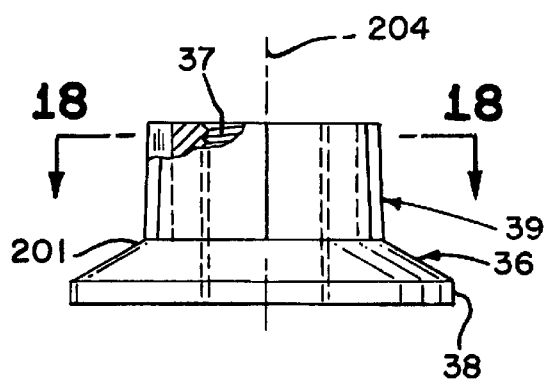
FIG._17
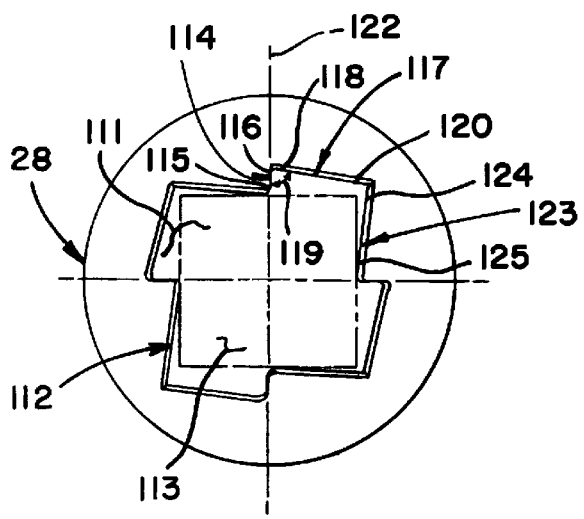
FIG._16
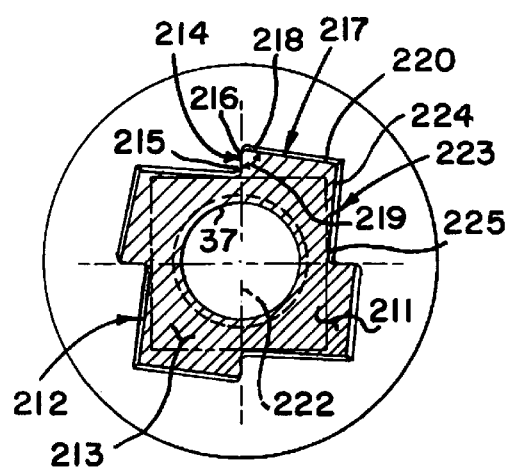
FIG._18

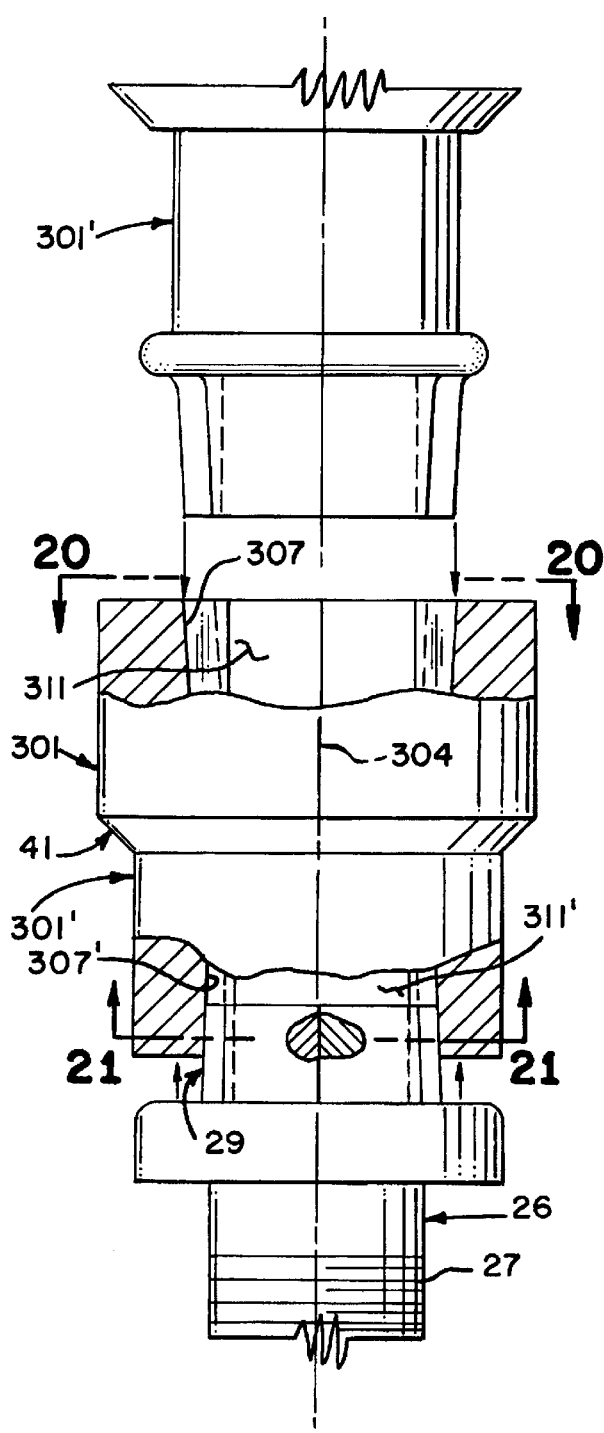
FIG._19
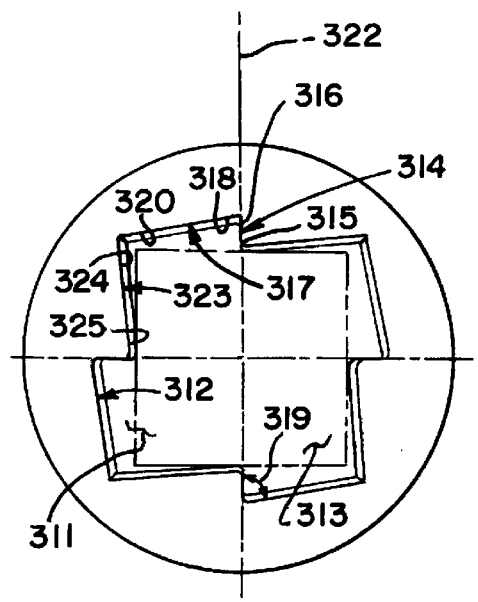
FIG._20
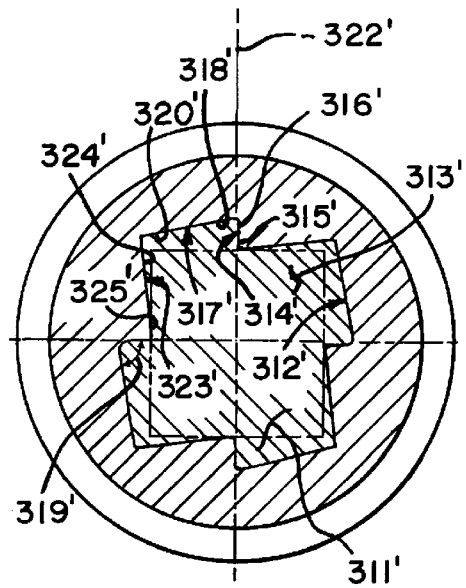
FIG._21

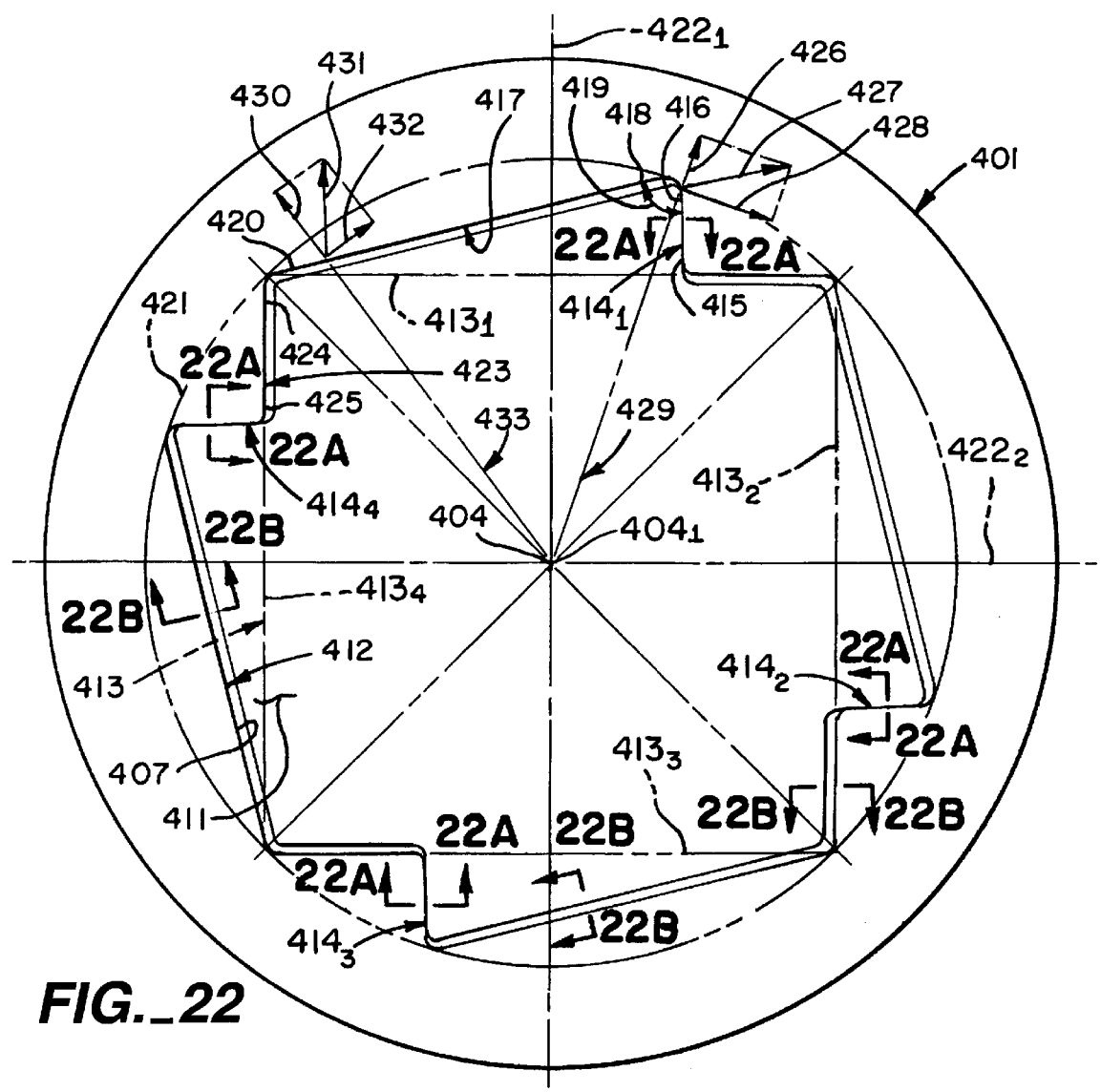
FIG._22
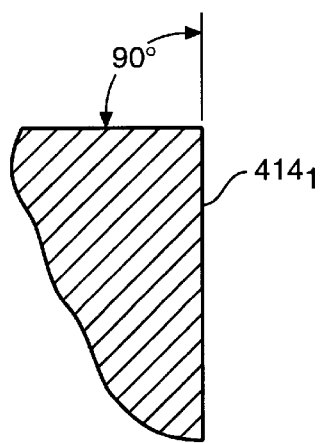
FIG._22A
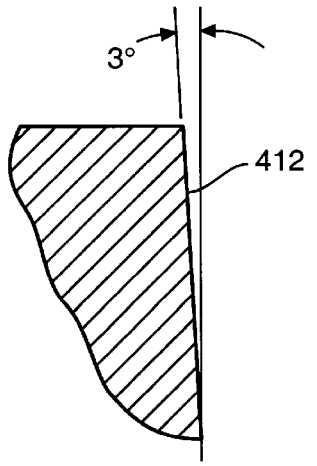
FIG._22B

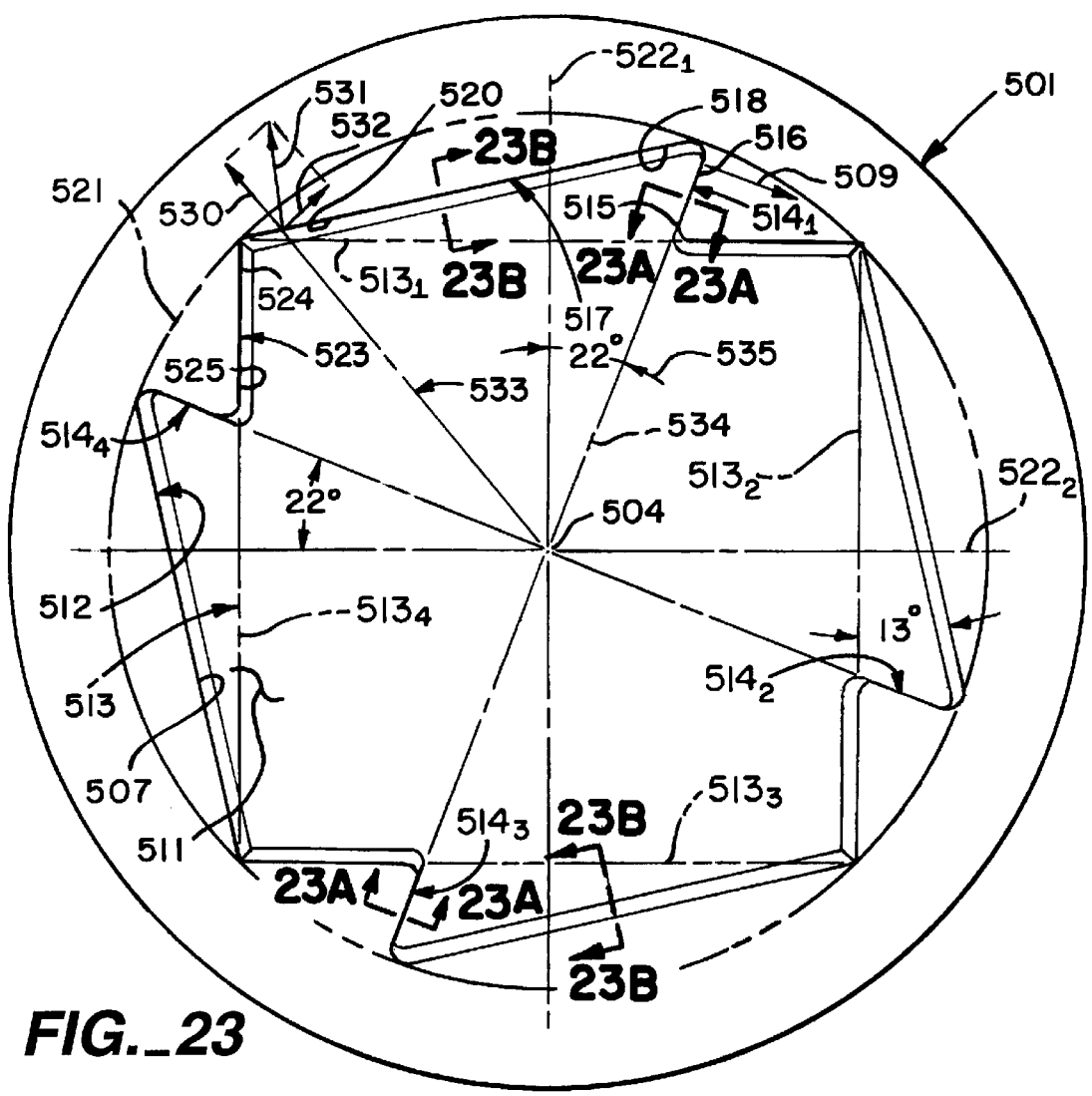
FIG._23
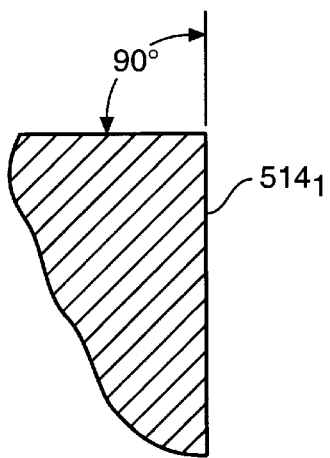
FIG._23A
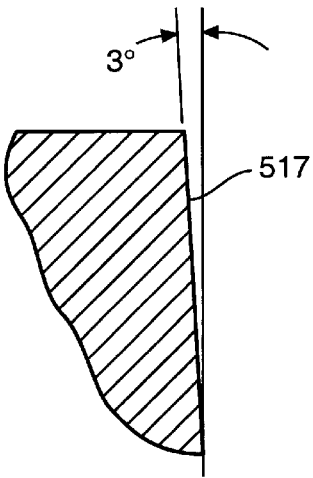
FIG._23B

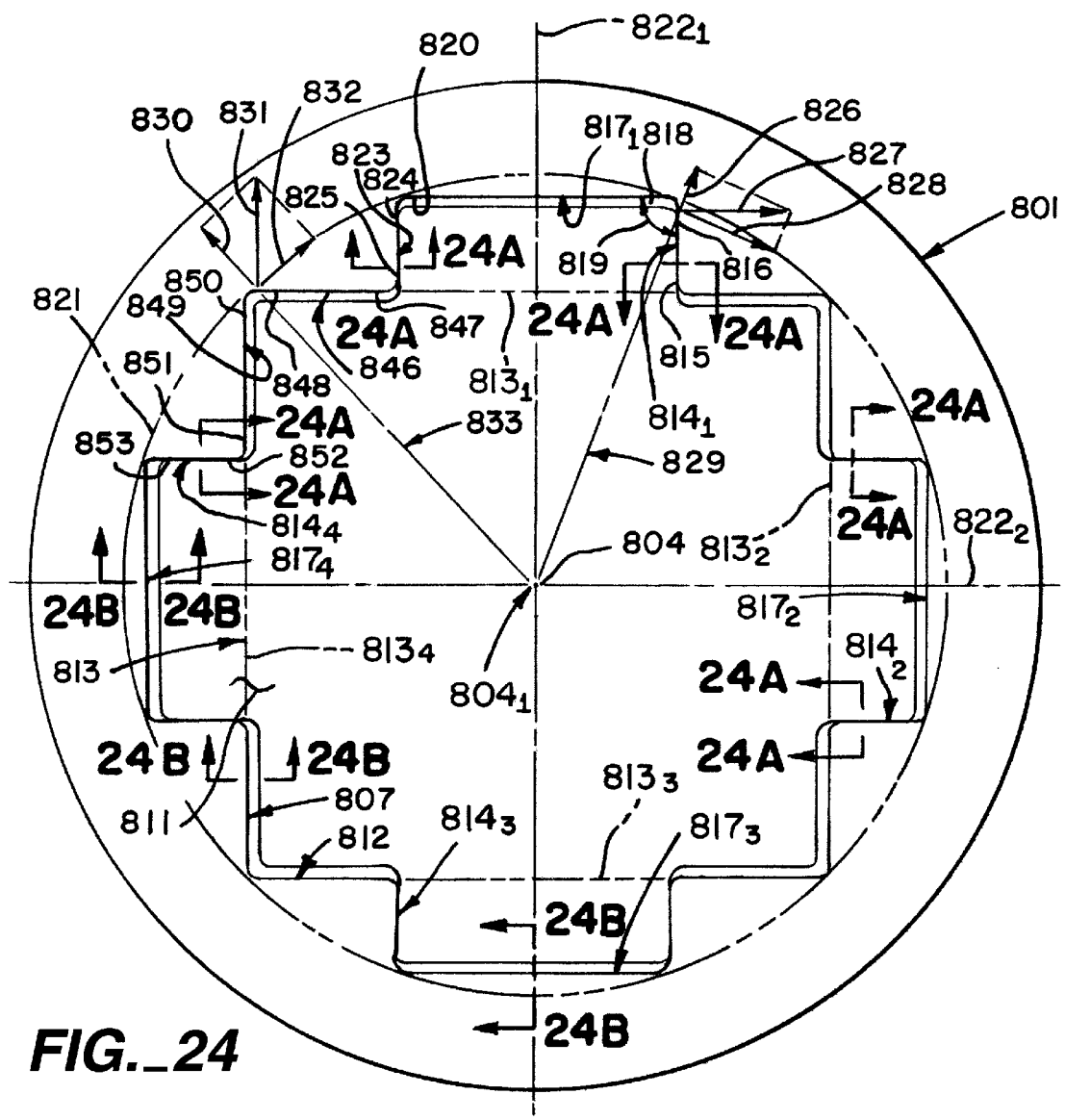
*FIG._24*
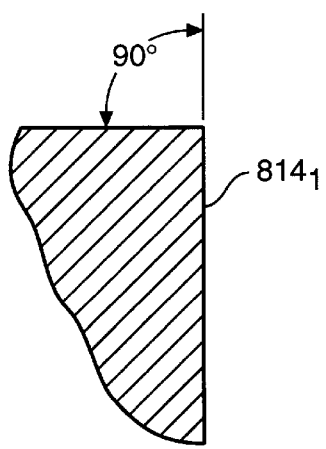
*FIG._24A*
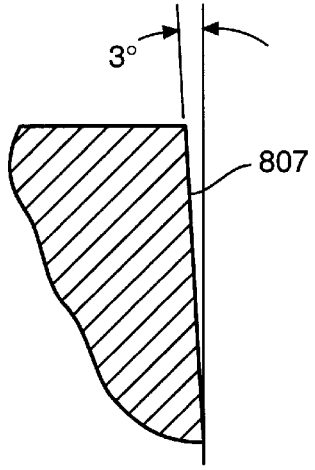
*FIG._24B*

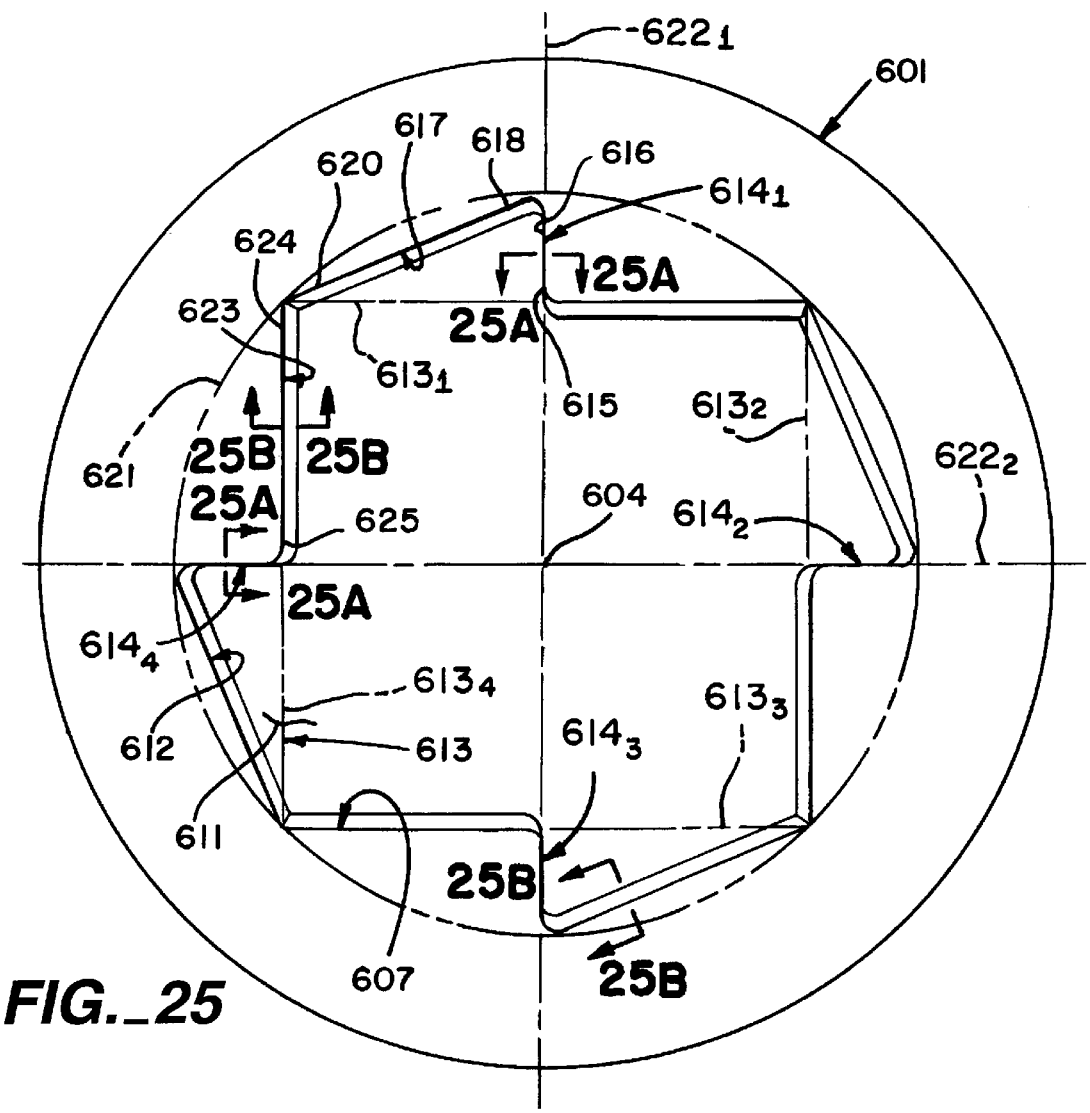
FIG._25
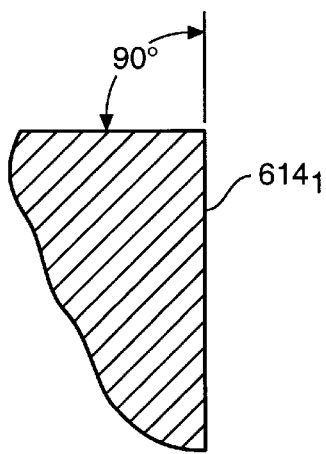
FIG._25A
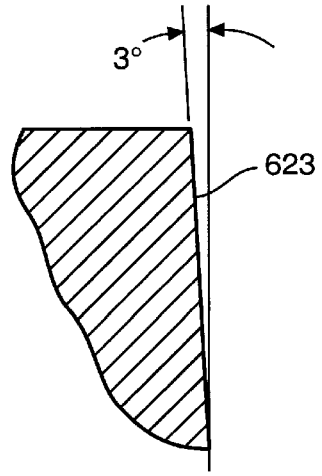
FIG._25B

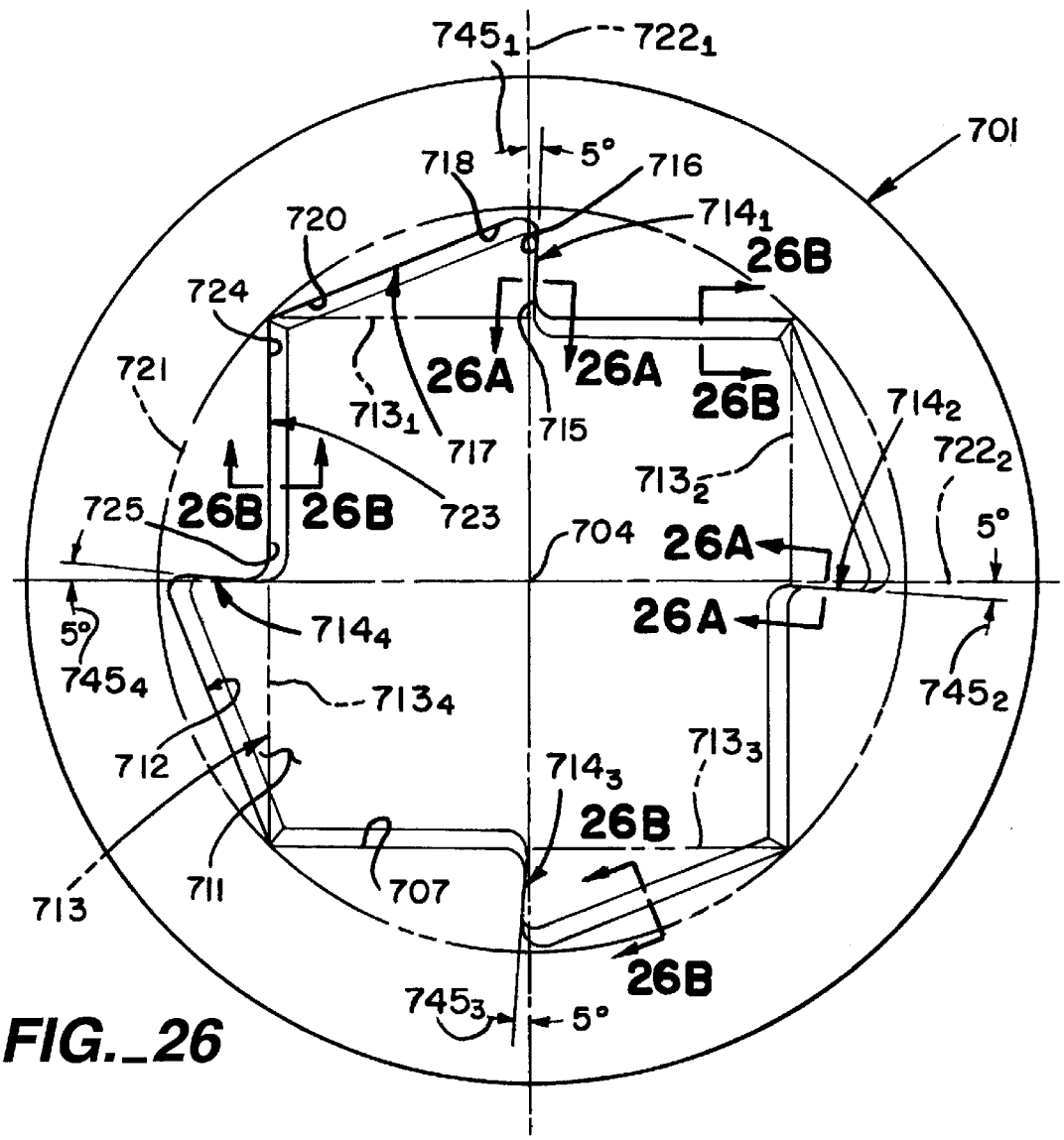
FIG._26
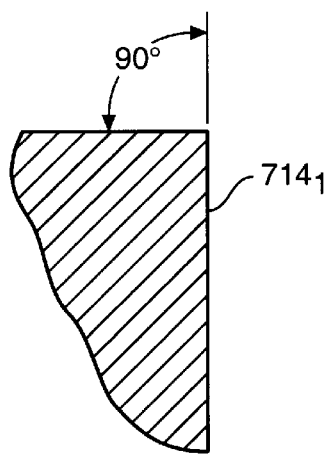
FIG._26A
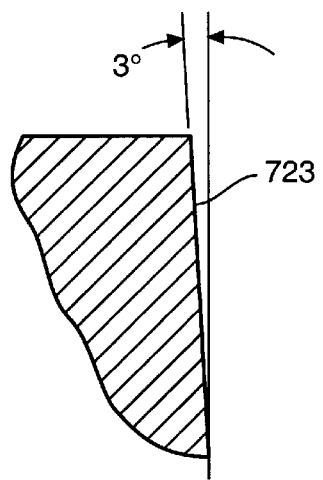
FIG._26B

DRIVER, FASTENER AND FORMING TOOL

This invention relates to a drive system wherein a first component such as a fastener driver applies a driving torque to a second component such as a threaded fastener, and a third component such as a forming tool for forming a recess in one of said first or second components with a modified polygonal interfit.

BACKGROUND

Following the introduction and mass use of the power fastener driver on the factory assembly lines in the late 1930s and early 1940s, a revolution in one of the oldest mechanical inventions of man occurred. The defining change was the massive torque applied by the power fastener driver. The last decade has seen the power fastener driver come into the hands of every journeyman craftsman and a high proportion of "do-it-yourselfers" due to the proliferation of relatively inexpensive and portable power fastener drivers.

The prior art has defined the parameters of the ultimate power driver and screw as follows: 1) A bit capable of delivering and a threaded fastener capable of receiving high torque forces; 2) A driver bit possessing a large central portion capable of reliably and repeatedly transmitting high torque forces; 3) A driver bit and interfitting threaded fastener configuration subject to low cam-out (also known as low rock-out) and 4) A driver and threaded fastener interfit having high stick-fit obviating the need for a magnetized bit and its concomitant problems.

SUMMARY OF THE INVENTION

The present invention discloses a fastener driver bit and threaded fastener which match the potential of the power fastener driver.

An object of the present invention is to provide a fastener driver bit which can transmit high torque forces to the head of a threaded fastener capable of receiving high torque forces by presenting a unique geometric recessed or external head configuration which is here characterized as "modified polygonal", and in more specific examples a "modified square".

A further object is to provide a fastener driver bit which can reliably and repeatedly deliver high torque to a threaded fastener due to a large central portion in the recess or external head and driver wall backed by a large support area.

A still further object is provide a fastener driver bit and interfitting threaded fastener recess head configuration which minimizes "cam out" due primarily to an asymmetrical configuration.

Another object is to provide a driver bit and interfitting threaded fastener configuration which minimizes wobble between the fastener and the driver as the fastener is being driven.

Still another object is to provide a "stick fit" between the driver bit and threaded fastener which eliminates the need for a magnetized bit, due primarily to registering broad axially tapered walls.

Another object is to provide a configuration wherein the fastener driver bit and treaded fastener can be mass produced inexpensively and reliably.

Still another object is provide a driver bit and interfitting threaded fastener configuration in which the fastener can be quickly and easily attached to the driver bit, carried to the location of the fastener, inserted by a power drill, and sunk to the desired location and the driver bit can be easily released from the threaded fastener.

BRIEF DESCRIPTION OF THE DRAWINGS

FIG. 1 is a front elevation view of a portion of a drive tool of the present invention positioned in alignment for insertion into the recess of a fastener of the present invention with portions of the fastener cut away for clarification of the invention.

FIG. 2 is a front elevation view of the drive tool and fastener of FIG. 1 fully engaged. Portions of the drive tool and fastener are removed for clarification of the invention.

FIG. 3 is a top plan view of the invention taken along line 3—3 of FIG. 1 with portions of the screw head in cross section. A square in phantom line is superimposed on the screw recess to illustrate the "modified square" configuration of the recess. The square in phantom line also graphically illustrates the ability of the fastener to be rotated by a driver having a square configuration.

FIG. 3A is a cross sectional view taken along 3A—3A in four locations on FIG. 3.

FIG. 3B is a cross sectional view taken along 3B—3B in 3 locations in FIG. 3.

FIG. 4 is a top plan view of the invention taken along line 4—4 of FIG. 2 with portions of the screw head and driver in cross section to more clearly illustrate the invention. A square in phantom line is superimposed on the cross section to more clearly illustrate the "modified square" relationship of the invention to a geometric square.

FIG. 4A is a cross sectional view taken along line 4A—4A at four locations on FIG. 4.

FIG. 4B is a cross sectional view taken along line 4B—4B at three locations on FIG. 4.

FIG. 5 is a side elevation view of an example fastener of the present invention with portions of the head in cross section to more clearly illustrate the invention.

FIG. 6 is a top plan view of the head of the fastener illustrated in FIG. 5 as viewed from the direction of the arrows on line 6—6. A phantom square is superimposed on the screw recess to illustrate a comparison between the "modified recess" of the present invention and a geometric square.

FIG. 7 is a side elevation view of an example driver having an end portion constructed in accordance with the present invention.

FIG. 8 is a side elevation view of a portion of the driver illustrated in FIG. 7 as viewed from the direction o the arrows on line 8—8 of FIG. 7.

FIG. 9 is an end view of the driver illustrated in FIG. 7 as viewed from the direction of the arrows on line 9—9 in FIG. 7. A phantom square is superimposed in the recess portion to illustrate a comparison between the "modified polygonal" recess of the present invention and a geometric square.

FIG. 10 is a side elevation view of a forming tool, punch or body used in forming the recess in the fastener head of the present invention. Portions are illustrated in cross section to further clarify the invention.

FIG. 11 is an end view of the forming tool illustrated in FIG. 10 as viewed from the direction of the arrows along line 11—11. A phantom square is superimposed within the fastener recess for the same reason asserted above. A portion of the view is in cross section where the forming tool is crossed by line 11—11.

FIG. 12 is a side elevation view of an example forming tool similar to the forming tool illustrated in FIG. 10 with portions cut away to better illustrate the construction of end of the forming tool.

FIG. 13 is an end view of the forming tool illustrated in FIG. 12 taken in the direction of the arrows along line 13—13. A phantom square is superimposed on the "modified square recess" of the present invention for the reasons set forth above.

FIG. 14 is a sectional view illustrating how the forming tool of FIG. 12 is used with other tooling (illustrated in cross section) to form the recess of the present invention in an example fastener.

FIG. 15 is a side view of another form of fastener formed with a head illustrating an external form of the present invention. Portions of the head are cut away to illustrate the configuration of the fastener head.

FIG. 16 is an end view of the fastener illustrated in FIG. 15 taken in the direction of the arrows along line 16—16 of FIG. 15.

FIG. 17 is a side view of a nut having an externally configured drive surface of the present invention. A portion of the nut is cut away to illustrate the invention.

FIG. 18 is a cross sectional view of the nut illustrated in FIG. 17 taken along line 18—18.

FIG. 19 is an exploded side elevation view of another use of the invention showing a fastener having a head with an external configuration of the present invention being driven by a socket member formed with an internal recess of the present invention with the other end formed with a recess using the configuration of the present invention with the upper member illustrating a driver for insertion into the upper recess of the socket member.

FIG. 20 is a top plan view of the socket illustrated in FIG. 19 taken along line 20—20 of FIG. 19.

FIG. 21 is a cross sectional view taken along line 21—21 of FIG. 19.

FIG. 22 is a top plan view of a fastener having a recess illustrating a modified form of the invention.

FIG. 22A is a cross section taken along lines 22A—22A at four different locations in FIG. 22.

FIG. 22B is a cross section taken along lines 22B—22B at three different locations in FIG. 22.

FIG. 23 is a top plan view of a fastener having a recess illustrating another modified form of the invention.

FIG. 23A is a cross section taken along lines 23A—23A at two different locations on FIG. 23.

FIG. 23B is a cross section taken along lines 23B—23B at two different locations on FIG. 23.

FIG. 24 is a top plan view of a fastener having a recess illustrating still another modified form of the invention.

FIG. 24A is a cross section taken along lines 24A—24A at five different locations on FIG. 24.

FIG. 24B is a cross section taken along lines 24B–23B at three different locations on FIG. 24.

FIG. 25 is a top plan view of a fastener having a recess illustrating a still further modified form of the invention.

FIG. 25A is a cross section taken along lines 25A—25A at two different locations on FIG. 25.

FIG. 25B is a cross section taken along lines 25B—25B at three different locations on FIG. 25.

FIG. 26 is a top plan view of a fastener having a recess illustrating still another modified form of the invention.

FIG. 26A is a cross section taken along lines 26A—26A on FIG. 25.

FIG. 26B is a cross section taken along lines 26B—26B at two different locations on FIG. 26.

DESCRIPTION OF THE INVENTION

When used in this specification, the word driver most commonly refers to a power driver of either the fixed type used in assembly lines, electrical powered used by journeyman workers or portable types powered by batteries used by professional and non-professional persons. The driver may also be a manual tool. The driver may be used to drive screws or bolts, whether with recesses or raised external configurations.

Threaded fasteners includes screws and bolts having either recessed or raised configurations.

Forming tool as used herein is a punch-like tool used to make the recess in either the fastener or the driver. An example of a forming tool is illustrated in FIG. 10.

A preferred embodiment of the present invention is illustrated in FIGS. 1–11 and the invention will be primarily described with respect thereto.

With respect to the fastener and drive tool, the drawings illustrate a particular application of the invention wherein the fastener is provided with a recess or socket having an internal configuration in accordance with the principles of the invention, while the complementary externally shaped components are in the form of a drive tool. Those skilled in the art will readily realize that this situation could be reversed in that the fastener could employ the external configuration in accordance with the invention while the drive tool would be in the form of a socket element having a complimentary internal configuration.

Directing attention to FIGS. 1, and 2 there is illustrated a fastener and drive tool arrangement in accordance with the concepts of the present invention. The fastener or body is designated generally 1, and includes an elongated shank 2 having a thread 3 formed thereon and an axis 4. An end 5 of the fastener 1 is provided with an enlarged or headed portion 6 having a recess or drive socket 7 formed therein. A drive tool or body 1' is also illustrated, which has an end portion 8' that is configured to a complementary shape to the recess 7 and is thus engageable therein such that the drive tool 1' can impart driving forces to the fastener 1.

Referring to FIG. 10, a forming tool, punch, or body 1" is illustrated having an end 10" portion with an end 5" configured to form the recess 7 in fastener 1.

In the description that follows, to reduce the number of part number designations and to make it easier to follow the description of the invention, the following conventions have been adopted. Identical numbers have been adopted for like parts in referring to the fastener, the driver and the forming tool, but differ in that a single prime (') is added to the driver and a double prime (") has been added to the forming tool. This convention will be followed most closely in FIGS. 1–11.

The article of manufacture for use in a torque transmitting system or the fabrication of components for such a system includes: a body 1,1', or 1" including an axis 4, 4', or 4"; the body 1, 1', or 1" having a modified polygonal cross section 11, 11', or 11" defined by a perimeter wall 12, 12', or 12"; a polygonal central portion 13, 13', or 13" positioned within the perimeter wall 12, 12', or 12" and having an area less than the area of the modified polygonal cross section 11, 11', or 11"; a drive wall 14, 14', or 14" forming a portion of the perimeter wall 12, 12' or 12" extending on a plane from a proximal end 15, 15' or 15" outwardly from the polygonal central portion 13, 13', or 13" to a distal end 16, 16' or 16"; a first outer wall 17, 17', or 17" forming another portion of the perimeter wall 12, 12", or 12" and disposed at an angle 19, 19', or 19" to drive wall 14, 14', or 14" and having a distal end 20, 20' or 20" terminating on the perimeter wall 12, 12', or 12" and a proximal end 18, 18' or 18" joining the distal end 16, 16' or 16" of the drive wall 14, 14' or 14".

The foregoing paragraph may be best understood by referring to one form of threaded fastener viz., a screw which is illustrated in Figs. 1, 2 and 3. The description of the foregoing paragraph also refers to one form of driver viz., a screw driver bit for a power driver (not shown). The description is not repeated as like parts for the driver illustrated in FIGS. 1 and 2 are indicated by the same numbers except they are followed by the prime mark ('). The description of the foregoing paragraph also refers to one form of tooling; viz. a punch for forming a recess in a screw fastener. The description is not repeated as like parts for the punch illustrated in FIGS. 10 and 11 are indicated by the same numbers except they are followed by the double prime mark (").

The polygonal central portion of fastener 1, generally shown by a broken line and designated by the number 13, may be made up of any number of straight lines of different lengths, but preferably the polygonal central portion 13 is formed with a symmetrical configuration. This configuration may be a triangle, pentagon, hexagon or configuration of more straight lines, but the preferred embodiment is a square for the fastener 1, for the driver 1', and for the tool 1".

The term "drive wall" identified by the number 14 for the fastener; 14' for the driver; and 14" for the tool, in this application, is used to indicate the main wall used to transmit or receive torque. For the tool, the drive wall 14" indicates the wall corresponding to the main torque receiving wall of the fastener. The location of the drive wall determines the efficiency of the drive system in transmitting rotational torque to the fastener. While almost all positions of the drive wall will transmit some torque, torque is optimized when the drive wall 14, 14' and 14" is on a plane generally on a radial axis $22_1$ or $22_2$, $22_1'$ or $22_2'$, and $22_1''$ or $22_2''$ of the axis 4 of the fastener; 4', of the driver; and 4" of the tool respectively. This maximum force is illustrated in FIG. 3 wherein force arrow 9 represents the magnitude and direction of force exerted by a driver (not shown) on drive wall 143. An identical force 9 is also exerted on drive walls $14_3$, $14_3$, and $14_3$.

The perimeter wall 12, 12' or 12" of the present invention is not limited to any specific number of sides. Preferably the perimeter wall 12, 12', or 12" includes a plurality of drive walls 14, 14', or 14" which are preferably on a radially axial plane 22, 22', or 22" as discussed above. There may be any number from 1 through 6 or more, but four drive walls 14, 14', or 14" has been found to be a number which gives satisfactory results. Preferably there is at least one first outer wall 17, 17', or 17" for each drive wall 14, 14', or 14" with each proximal end 15, 15', or 15" respectively joining the distal ends 16, 16' or 16" of the respective drive walls 14, 14', or 14". Preferably, a plurality of second outer walls 23, 23', or 23" are provided having proximal ends 24, 24', or 24" respectively joined to each of the distal ends 20, 20', or 20" of the first outer walls 17, 17', or 17" and have distal ends 25, 25', or 25" respectively joined to the proximal ends 15, 15', or 15" of each of the successive drive walls 14, 14', or 14".

It has been found, as illustrated in the drawings, that the perimeter wall 12, 12', or 12" composed of four drive walls 14, 14', or 14" and four first outer walls 17, 17', or 17" gives excellent results.

As an inherent benefit of the present configuration of the perimeter walls 12 the torque system of the present invention exhibits excellent resistance to "cam-out" which is also known as "rock-out". This phenomenon is described in U.S. Pat. No. Re 24,878 granted to I. A. Smith on a Phillips type head with special offset grooves. No further explanation appears needed in view of the explanation set forth in U.S. Pat. No. Re 24,878. Suffice it to say that oppositely directed pairs of drive walls 14 and first outer walls 17 are oppositely configured so that the driver 1' will be locked in the recess 7 against any relative movement except withdrawal in a substantially axial direction. In the present invention, anti-cam out can be achieved by simply configuring the perimeter wall 12 in an asymmetrical geometric configuration.

Another feature of the present invention is the ability of the screw to "stick" to the driver without magnetizing either the driver or the screw. This feature is achieved by tapering at least a portion of the perimeter wall 12 of the recess 7 of the fastener 1 in an inward direction in close registration with a matching similarly tapering wall on the perimeter wall 12' of driver 1'.

Applicant is not claiming the invention of "stick-fit" per se, since the phenomenon of "stick-fit" is well known in the fastener art. Applicant is, however, claiming a fastener recess configuration which achieves greater "stick-fit" than has been previously achieved. In addition, Applicant has invented a new fastener configuration, which achieves greater "stick-fit" over a greater number of cycles of drivers used to insert screws than ever before. In prior art systems, as the driver is used over and over to insert hundreds of fasteners, the faces of the drivers used to achieve stick fit wear and the close tolerance registrations required to achieve "stick-fit" slowly cease to exist. Applicant's ability to achieve this long lasting "stick-fit" results from the unique configuration of the perimeter wall 12 which includes at least one wall which has a surface area greater than the surface area of the drive wall which is not used as the primary driver wall. Of course, Applicant provides a driver 1' which also has at least one wall which has a surface area greater than the surface are of the drive wall which is in close registration with the similar wall in the fastener recess.

To illustrate the foregoing, compare for example, the fastener recess configuration of U.S. Pat. No. 5,509,334 which was granted a patent over a well known commercial screw protected by U.S. Pat. No. 5,279,190. The sole difference between the two patents is the addition of tiny triangular "stick-fit" walls in the U.S. Pat. No. 5,509,334 patent by making a simple modification of the perimeter wall of U.S. Pat. No. 5,279,190. This minor modification resulted in "stick-fit" which is itself a major improvement of the U.S. Pat. No. 5,279,190 patents.

A difference, however, between the 5,509,334 patent and the present invention is the fact that applicant can provide a stick-fit wall having a much greater area than the stick-fit walls achieved by U.S. Pat. No. 5,509,334. Further, Applicant's configuration is such that the stick-fit wall may be a wall which is not used as the primary driver wall and thus does not wear as fast as the driver wall. Finally, Applicant's "stick-fit"wall may have a substantially greater area than the primary driver wall.

Preferably polygonal central portion 13, 13' or 13" is formed with a symmetrical configuration for ease in insertion of the driver into the recess of the fastener.

As shown in the drawings, the polygonal central portion 13, 13', or 13" is a square. A square configuration permits fasteners formed with a recess configuration of the present invention to be installed with drivers having a standard square configuration. While this is not the most desirable way of inserting the fasteners of the present invention, it does permit a workman to use a square driver if he does not happen to have a driver having the configuration of the present invention.

As illustrated in FIG. 3, it is preferred that drive wall 14 of the fastener is located on a plane generally on a radial axis of the axis 22 of the body 1 of the fastener. This configuration ensures that the maximum torque of the driver 1' will be transmitted through drive wall 14' of the driver to the drive wall 14 of the fastener.

While the torque transmitting system of the present invention would be operable with only a single drive wall, obviously two or more drive walls provides greater torque transmission. As shown, e.g. in FIG. 3, perimeter wall 12 comprises a plurality of drive walls 14, namely four, each on a radially axial plane such as radial axes 22. In like manner, it is preferable that there be a perimeter wall 12, comprising a plurality of first outer walls 17 with each proximal end 18 respectively joining the distal ends 16 of the plurality of drive walls 14, and a plurality of second outer walls 23 having proximal ends 24 respectively joined to each of the distal ends 20 of the first outer walls 17 and having distal ends 25 respectively joined to the proximal ends 18 of each of the successive driver walls 14. Each of the driver walls 14 have been labeled on the drawings, but only one set of the other walls on perimeter 12 is labeled in the interests of brevity. In like manner, only one set of walls in the driver and the tool are labeled on FIGS. 4 and 11.

As illustrated in FIGS. 1–11, all of the forms of the invention illustrated have perimeter walls 12, 12' or 12" which are asymmetrical. In comparison, the fastener recess in U.S. Pat. No. 5,207,132 has a wall forming the internal configuration of the recess which is symmetrical. In the form of the invention described in this application, e.g. the forces of the driver on the recess of the fastener are markedly different in clockwise and counterclockwise rotational directions whereas the forces in U.S. Pat. No. 5,207,132 exerted by a driver on the recess of the fastener are identical whether the force is applied clockwise or counterclockwise.

As illustrated in FIGS. 1–11, it may be seen that at least a portion of the perimeter walls 12 in the recess of the fastener taper inwardly in an axial direction in close registration with a matching similarly tapering wall 12' on the perimeter of the driver. As illustrated in FIG. 3, preferably, driver walls 14 are not tapered, while first outer walls 17 and second outer walls 23 are tapered. It is possible that the number of walls that are tapered could be reduced depending upon the amount of "stick-fit" that is required for a particular application. As shown in FIG. 4B, this taper may, e.g. be 30.

Preferably, the portion of perimeter walls 12 of the fastener which taper are walls other than the driver wall 14'. This increases the area of the driver walls 14" which are exerting a torque force.

In order to maximize "stick-fit", the number and areas of perimeter walls 12 should be increased. Applicant has found that in many applications, to provide sufficient "stick-fit" and to provide sufficient wall area for applying torque, all portions of the perimeter wall 12 and 12' are tapered except the drive walls 14 and 14' which are on a plane vertical to the axis of the fastener.

The substantially non-driving portions of the perimeter wall of the fastener and the registering driver have an area substantially greater than the drive walls of the fastener and the registering driver. As set forth in FIG. 3 for example the areas of first outer wall 17 and second outer wall 23 combined are greater than the area of drive wall 14. Because the tapered walls 17 and 23 which cause the "stick-fit" are not used substantially to transmit torque, very little wear occurs on these walls, thus the function of "stick-it can survive many repeated uses of the driving tool.

Referring to FIGS. 15 and 16, a fastener bolt 26 is illustrated formed with threads 27, a head flange 28 and a driving head 29 having a perimeter wall 112 with an external configuration identical to the internal configuration of the recess illustrated in FIG. 3.

The fastener bolt 26 article of manufacture for use in a torque transmitting system includes a body 101 including an axis 104; the body 101 has a modified polygonal cross section 111 defined by a perimeter wall 112; a polygonal central portion 113 positioned within the perimeter wall 112 and has an area less than the area of the modified polygonal cross section 111; a drive wall 114 forming a portion of the perimeter wall 112, extending on a plane from a proximal end 115 outwardly from the polygonal central portion 113 to a distal end 116; a first outer wall 117, forming another portion of the perimeter wall 112 and disposed at an angle 119 to drive wall 114 and has a distal end 120 terminating on the perimeter wall 112 and a proximal end 118 joining the distal end 116 of the drive wall 114.

Referring to FIGS. 17 and 18, a fastener nut 36 is illustrated formed with internal threads 37, a head flange 38 and a driving head 39 having a perimeter wall 212 with an external configuration identical to the internal configuration of the recess illustrated in FIG. 3 and to the external configuration of driving head 29 in FIG. 15.

The fastener nut 36 article of manufacture for use in a torque transmitting system includes a body 201 including an axis 204; the body 201 has a modified polygonal cross section 211 defined by a perimeter wall 212; a polygonal central portion 213 positioned within the perimeter wall 212 and has an area less than the area of the modified polygonal cross section 211; a drive wall 214 forming a portion of the perimeter wall 212, extending on a plane from a proximal end 215 outwardly from the polygonal central portion 213 to a distal end 216; a first outer wall 217, forming another portion of the perimeter wall 212 and disposed at an angle 219 to drive wall 214 and has a distal end 220 terminating on the perimeter wall 212 and a proximal end 218 joining the distal end 216 of the drive wall 214. It is to be understood that flange 38 is not essential to the invention but is shown for illustrative purposes only. The driving head 39 may be a straight wall as found on most internally threaded driving nuts.

Referring, now, to FIGS. 15–18, the perimeter walls 112 and 212 of the present invention are not limited to any specific number of sides. Preferably the perimeter walls 112 and 212 include a plurality of drive walls 114 and 214 which are preferably on a radially axial plane 122 and 222 as discussed above. There may be any number from 1 through 6 or more, but four drive walls 114 or 214 has been found to be a number which gives satisfactory results. Preferably, a plurality of second outer walls 123, or 223 are provided having proximal ends 124 or 224 respectively joined to each of the distal ends 120 or 220 of the first outer walls 117 or 217 and have distal ends 125 or 225 respectively joined to the proximal ends 115 or 215 of each of the successive driver walls 114 or 214.

Referring to FIGS. 19–21, an article of manufacture is illustrated for coupling with a driver 301' at one end and coupling at the other end with a fastener bolt 26 having an externally configured driving head 29 wherein: the article is a coupling socket member 41 having a pair of oppositely, but axially positioned recesses 307 and 307' in which one of the recesses 307 couples with the driver 301' and the other recess 307' couples with the driving head 29 of the fastener bolt 26.

The coupling socket member 41 includes: bodies 301 and 301' including an axis 304; the bodies 301 and 301' each having a modified polygonal cross section 311 and 311' respectively defined by a perimeter wall 312 and 312' respectively; a polygonal central portion 313 and 313' positioned within the respective perimeter walls 312 and 312' and having an area less than the area of the respective modified polygonal cross sections 311 and 311'; drive walls 314, and 314' forming a portion of the respective perimeter walls 312 and 312' extending on a plane from a proximal end 315, and 315' outwardly from the polygonal central portion 313 and 313' to distal ends 316 and 316'; and first outer walls 317 and 317' forming another portion of the perimeter walls 312 and 312' and having proximal ends 318 and 318' joining the distal ends 316 and 316' of the respective drive walls 314 and 314' at angles 319 and 319' and distal ends 320 and 320' terminating on the perimeter walls 312 and 312'.

Still referring, to FIGS. 19–21, the perimeter walls 312 and 312' of the present invention are not limited to any specific number of sides. Preferably the perimeter walls 312 and 312' include a plurality of drive walls 314 and 314' which are preferably on a radially axial plane 322 and 322' as discussed above. There may be any number from 1 through 6 or more, but four drive walls 314 or 314' has been found to be a number which gives satisfactory results. Preferably, a plurality of second outer walls 323 or 323' are provided having proximal ends 324 and 324' respectively joined to each of the distal ends 320 and 320' of the first outer walls 317 and 317 and have distal ends 325 and 325' respectively joined to the proximal ends 315 and 315' of each of the successive driver walls 314 and 314'.

FIGS. 22, 22A and 22B illustrate the first of five modified forms of the previously described invention. Although the geometry of the invention is changed, the essence of the invention remains the same. All of the five modified forms of the invention are based on claim one with certain differences which will be set forth below. Because the essence of the invention is the same, applicant has, for purposes of brevity, fully described only the fastener article. The driver article and the drive tool article for the five modified forms are not illustrated since they follow the teachings of the fastener article as above described for the preferred form of the invention. In other words, in all of the modified forms to be illustrated, the driver article is configured to register with the recess in the fastener article, and the drive tool article or punch, as it is often called, is configured to form the recess in the fastener article.

Turning now to FIGS. 22, 22A and 22B specifically, the article of manufacture for use in a torque transmitting system or the fabrication of components for such a system includes: a body 401 including an axis 404; the body 401 having a modified polygonal cross section 411 defined by a perimeter wall 412; a polygonal central portion 413 positioned within the perimeter wall 412 and having an area less than the area of the modified polygonal cross section 411; a drive wall 414 forming a portion of the perimeter wall 412 extending on a plane from a proximal end 415 outwardly from the polygonal central portion 413 to a distal end 416; a first outer wall forming another portion of the perimeter wall 412 and disposed at an angle 419 to drive wall 414 and having a distal end 420 terminating on the perimeter wall 412 and a proximal end 418 joining the distal end 416 of the drive wall 414.

The unique structure illustrated in FIG. 22 is the fact that the distal end 416 of the drive wall 414 and the distal end 420 of the first outer wall 417 lie on a common great circle 421 whose axis $404_1$ is coincident with the axis 404 of the body 401; and the drive wall 414 is substantially parallel to the axis $422_1$ bisecting the adjacent walls of the polygonal central section 413. Thus as shown in FIG. 22, drive wall $414_1$ is parallel to axial plane $422_1$ bisecting perimeter line $413_1$; drive wall $414_2$ is parallel to axial plane $422_2$ bisecting perimeter line $413_2$; drive wall $414_3$ is parallel to axial plane $422_1$ bisecting perimeter line $413_3$; and drive wall $414_4$ is parallel to axial plane $422_2$ bisecting perimeter line $413_4$. The foregoing structure, maximizes the torque exerted by the driver on the screw since the drive wall is further from the center of rotation in the previously described fasteners.

Force arrow 426 indicates the component of force exerted by a driver (not shown) exerted radially outwardly along radial axial plane 429 against the side of the recess 407 of the fastener and which intersects the intersection of drive wall 414 and first outer wall 417 but which does not result in any rotational force being transferred to the fastener. Arrow 427 indicates the resultant force line and arrow 428 represents the amount of rotational force exerted by the driver (not shown) on the fastener body 401.

Another structural feature of the fastener illustrated in FIG. 22 is the fact that the recess is formed by a plurality of second outer walls 423 having proximal ends 424 respectively joined to each of the distal ends 420 of the first outer walls 417 and having distal ends 425 respectively joined to the proximal ends 415 of each of the successive drive walls 414, and the first outer wall 417 is substantially longer than the second outer wall 423. This structure maximizes the amount of material in the driver (not shown). Thus the driver would have material falling within the area bounded by the lines forming drive wall 414, phantom line 413 forming one side of polygonal central portion 413 and first outer wall 417.

FIG. 22A illustrates that drive walls 414 are parallel to the axis 404 of the body of the fastener and FIG. 22B illustrates that first outer walls 417 and second outer walls 423 are slanted at about 3 degrees so that the fastener body 401 will "stick" to the driver (not shown), without the need for magnetizing the driver.

Force arrows 430, 431 and 432 represent the components of force exerted at a given point on first outer wall 417 and in relation to an axis line 433. Arrow line 430 represents the force exerted against the edge of the recess of the body 401 of the fastener and which contributes nothing to the rotation of the fastener body 401. Force arrow 431 is a resultant force and force arrow 432 represents the force exerted by a driver (not shown) against first outer wall 417 which results in rotation of the body 401 of the fastener. It is also to be understood that force arrow 432 when reversed 180° is the force at this particular point which would be exerted by a driver (not shown) when backing out the body 401 of a fastener.

The structure illustrated in FIG. 23 is identical to the structure illustrated in FIG. 22 except that the drive walls 514 lie along a radial axial plane 534 which emanates from body axis 504. Radial axial plane 534 may be located at various angles 535 from radial axial plane $522_1$ which bisects perimeter line $513_1$ of polygonal central portion 513 but as illustrated in FIG. 23, an angle 535 of 22° works satisfactorily.

In the interests of brevity, like elements of FIG. 23 are designated by the same numbers set forth in FIG. 22 except that the elements of FIG. 22 are designated in a "400" series of numbers and the elements of FIG. 23 are designated in a "500" series of numbers. A description of FIGS. 23, 23A and 23B is therefor not repeated.

The rotational force imparted by a driver (not shown) on drive wall 514 as represented by force arrow 509 is maximized since it is acting in a direction at right angles to the radial axial plane 534.

Turning now to FIG. 25, another form of the invention . The structure illustrated in FIG. 25 is similar to the structure illustrated in FIG. 3 and in the interest of brevity the description of like parts will not be repeated. Like parts in FIG. 25 will be given the same number as in FIG. 3 except that the numbers of FIG. 25 will designated in a "600" series of numbers.

The difference in the structure illustrated in FIG. 25 over the structure of FIG. 3 is the fact that the distal ends 616 of drive walls 614 and the distal ends 620 of first walls 617 lie on a great circle 621 whose axis is coincident with the axis 604 of body 601. As in FIG. 3, drive wall 614 is on a plane generally on a radial axis 622. This results in providing drive walls 614 which are longer in length than the drive walls 14 of FIG. 3, thus providing a greater area of surface contact between the driver (not shown) and the fastener for transmitting rotational forces to the fastener.

Referring now to FIG. 26, still another modified form of the invention is illustrated. This modified form of the invention is identical to the form of the invention illustrated in FIG. 25 except that the drive walls $614_1$, $614_2$, $614_3$, $144_4$ are angled 5° as illustrated in FIG. 26. In the interests of brevity, like parts in FIG. 26 will be given the same number as in FIG. 25 except that the elements of FIG. 26 are designated in a "700 series" instead of a "600 series" and the description will not be repeated. For example, when viewing an element in FIG. 26, to determine the designation of the element and its description, simply note the last two digits of the number and refer to that number in the specification.

Specifically, the difference between the body 701 of FIG. 26 and the body 601 in FIG. 25 is the fact that drive wall $714_1$ is canted at an angle $745_1$ of approximately 5° in a clock wise direction from radial axial plane $722_1$ which bisects perimeter line $713_1$ of polygonal central portion 713. In like manner drive wall $714_2$ is canted at an angle $745_2$ of approximately 5° clockwise from radial axial plane $722_2$ which bisects perimeter line $713_2$ of polygonal central portion 413; drive wall $714_3$ is canted at an angle $745_3$ of approximately 5° clockwise from radial axial plane $722_1$ which bisects perimeter line $713_3$ of polygonal central portion 413; and drive wall $714_4$ is canted at an angle $745_4$ of approximately 5° clockwise from radial axial plane $722_2$ which bisects perimeter line $713_4$ of polygonal central portion 413.

Turning now to FIGS. 24, 24A and 24B, another modified form of the invention is illustrated. The modified form of the invention is identical in concept to all the other forms of the invention illustrated and in the interests of brevity, like elements in FIG. 24 will be given the same two digit number as in the other Figures except that the elements of FIG. 24 are preceded by the number "8" in an "800 series". The description of such like elements will not be repeated. For example, when viewing an element in FIG. 24, to determine the designation of the element and its description, simply note the last two digits of the number and refer to that number in the earlier part of the specification. As a further clarification, perimeter wall 812 of FIG. 24 is similar to perimeter wall 12 of FIG. 3, perimeter wall 112 of FIG. 16, perimeter wall 212 of FIG. 18, perimeter wall 312 of FIG. 19, perimeter wall 412 of FIG. 22, perimeter wall 512 of FIG. 23, perimeter wall 612 of FIG. 25 and perimeter wall 712 of FIG. 26.

The structure illustrated in FIG. 24 is unique from the other forms of the invention shown in that the perimeter wall 812 is symmetrical about axis $804_1$ providing substantially equal bidirectional torque transmitting force. In other words, because of the configuration of the recess of the screw fastener and the matching driver, the force transmitted to a screw fastener by a driver in inserting a fastener is the same as in backing out the screw fastener from a work piece.

Still another feature of the form of the invention illustrated in FIG. 24 is the fact that a standard square configured driver can be used to insert or back out the fastener illustrated in FIG. 24. This very practical feature is illustrated by the polygonal central portion 813 which forms a perfect square such as a standard square shanked driver.

Specifically, referring to FIG. 24, the article of manufacture for use in a torque transmitting system or the fabrication of components for such a system includes: a body 801 including an axis 814; the body 801 having a modified polygonal cross section 811 defined by a perimeter wall 812; a polygonal central portion 813 positioned within the perimeter wall 812 and having an area less than the area of the modified polygonal cross section 811; a drive wall 814 forming a portion of the perimeter wall 812 extending on a plane from a proximal end 815 outwardly from the polygonal central portion 813 to a distal end 816; a first outer wall 817, forming another portion of the perimeter wall 812 and disposed at an angle 819 to drive wall 814 and having a distal end 820 terminating on the perimeter wall 812 and a proximal end 818 joining the distal end 816 of the drive wall 814. As previously explained, the configuration of the screw fastener illustrated in FIG. 24 may also be adapted to take the form of a driver, or a tool used for form the recess in the screw fastener.

The structure illustrated in FIG. 24 is unique by virtue of the fact that the distal end 816 of the drive wall 814 and the distal end 820 of the first outer wall 817 lie on a common great circle 821 whose axis $804_1$ is coincident with the axis 804 of the body 801; and the drive wall $814_1$ is substantially parallel to the axis $822_1$ bisecting the adjacent walls of the polygonal central section. Thus as shown in FIG. 24, drive wall $814_1$ is parallel to axial plane $822_1$ bisecting perimeter line $813_1$; drive wall $814_2$ is parallel to axial plane $822_2$ bisecting perimeter line $813_2$; drive wall $814_3$ is parallel to axial plane $822_1$ bisecting perimeter line $813_3$; and drive wall $814_4$ is parallel to axial plane $822_2$ bisecting perimeter line $813_4$. The foregoing structure maximizes the torque exerted by the driver on the screw since the drive wall is further from the center of rotation in the previously described fasteners except the fastener illustrated in FIG. 22.

Force arrow 826 indicates the component of force exerted by a driver (not shown) exerted radially outwardly along radial axial plane 829 against the side of the recess 807 of the fastener and which intersects the intersection of drive wall 814 and first outer wall 817 but which does not result in any rotational force being transferred to the fastener. Arrow 827 indicates the resultant force line and arrow 828 represents the amount of rotational force exerted by the driver (not shown) on the fastener body 801.

Another structural feature of the fastener illustrated in FIG. 24, and which provides the bidirectional torque transmitting force, is the fact that the recess is formed by a plurality of second outer walls 823 having proximal ends 824 respectively joined to each of the distal ends 820 of the first outer walls 817. As illustrated in FIG. 24, second outer wall 823 is substantially parallel to the drive wall 814. The form of the invention illustrated in FIG. 24 further differs from the previous forms of the invention in that a third outer wall 846 has a proximal end 847 joining the distal end 825 of the second outer wall 823 and a distal end 848. Distal end 848 of third outer wall 846 and proximal end 850 of fourth outer wall 849 lie generally on common great circle 821.

Perimeter wall 812 may further include a fourth outer wall 849 having a proximal end 850 joining the distal end 848 of the third outer wall 846 and a distal end 851; a fourth drive wall 814$_4$ having a proximal end 852 joining the distal end 851 of the fourth outer wall 849 and a distal end 853 lying on said great circle 821; and the fourth drive wall 814$_4$ is substantially parallel to an axis 822$_2$ bisecting the adjacent wall 813$_4$ of the polygonal central portion 813.

FIG. 24A illustrates that drive walls 814 are parallel to the axis 804 of the body of the fastener and FIG. 24B illustrates that first outer walls 817$_1$, 817$_2$, 817$_3$, 817$_4$, third outer walls 846, and fourth outer walls 849 are slanted at about 3 degrees so that the fastener body 801 will "stick" to the driver (not shown), without necessarily magnetizing the driver.

Force arrows 830, 831 and 832 represent the components of force exerted at a given point on third outer wall 846 and in relation to an axis line 833. Arrow line 830 represents the force exerted against the edge of the recess of the body 801 of the fastener and which contributes nothing to the rotation of the fastener body 801. Force arrow 831 is a resultant force and force arrow 832 represents the force exerted by a driver (not shown) against third outer wall 846 which results in rotation of the body 801 of the fastener. It is also to be understood that force arrow 832 when reversed 180° is the force at this particular point which would be exerted by a driver (not shown) when backing out the body 801 of a fastener.

An example of one use of the present invention is illustrated in FIG. 5 in which a body 1 of a fastener such as a self drilling threaded screw with a head 6 is formed with a recess 7 in accordance with the present invention. As illustrated in FIG. 6, the first outer wall 17 of the fastener may have varying angular relationships with perimeter line 13, and the angle 55 here illustrated is 10°. Likewise, the angle 54 formed by second outer wall 23$_4$ of the fastener may have varying angles but is here shown as 5°.

Another use of the present invention is its application to a body 1' of a driver used to insert fasteners into a work piece. The end 5' of the driver 1' is configured as described in the present invention. The taper angle 56' of the end 5' of the driver may vary and is here shown as 3°. Preferably, the tip of the end 5' of the driver is formed with a cone shape in which the angle 57' may vary, but is here shown as 20°.

1 Body of fastener FIG. 1
1' Body of driver FIG. 1
1" Body of tooling FIG. 10
2 shank of Fastener (1) fig 1
3 thread of fastener (1) FIG. 1
4 Axis of fastener FIG. 1
4' Axis of driver FIG. 1
4" Axis of tooling FIG. 10
5 end of fastener FIG. 1
5' end of driver that fits into end 5 of the screw recess FIGS. 1, 7, 8, 9
5" End of tooling FIG. 10
6 head of Fastener (1) FIGS. 1, 2
7 recess of Fastener (1) FIG. 1
8' end portion of Driver 1' (the entire end portion) FIG. 1
9 force arrow (FIG. 3)
10" end portion of Forming Tool 1" FIG. 10
11 modified polygonal cross section of fastener FIG. 3
11' modified polygonal cross section of driver FIG. 4
11" Modified polygonal cross section of tooling FIG. 11
12 Perimeter wall of fastener FIG. 3
12' Perimeter wall of driver FIG. 4
12" Perimeter wall of tooling FIG. 11
13 polygonal Central portion of fastener FIG. 3
13$_1$ perimeter line of polygonal central portion 13
13' polygonal Central portion of driver FIG. 4
13" polygonal Central portion of tooling FIG. 11
14$_1$ Drive wall of fastener FIG. 3.
14$_2$ Drive wall of fastener FIG. 3
14$_3$ Drive wall of fastener FIG. 3
14$_4$ Drive wall of fastener FIG. 3
14' Drive wall of driver FIG. 4
14" Drive wall of tooling FIG. 11
15 proximal end of Drive wall 14 of fastener FIG. 3
15' proximal end of Drive Wall 14' of Driver FIG. 4
15" proximal end of Drive Wall 14" of Tooling FIG. 11
16 distal end of Drive Wall (14) of fastener FIG. 3
16' distal end of Drive Wall (14') of driver FIG. 4
16" distal end of Drive Wall (14") of tooling FIG. 11
17 First outer wall fastener FIG. 3
17' First outer wall driver FIG. 4
17" First outer wall tooling FIG. 11
18 proximal end of first outer wall (17) of fastener FIG. 3
18' proximal end of first outer wall (17') of driver FIG. 4
18" proximal end of first outer wall (17") of tooling FIG. 11
19 angle between driver wall and first outer wall of fastener FIG. 3
19' angle between driver wall and first outer wall of driver FIG. 4
19" angle between driver wall and first outer wall of tooling FIG. 11
20 distal end of first outer wall 17 of fastener FIG. 3
20' distal end of first outerwall 17' of driver FIG. 4
20" distal end of first outerwall 17" of tooling FIG. 11
21 Not assigned
22$_1$ Radial axis of fastener FIG. 3
22$_2$ Radial axis of fastener FIG. 3
22$_1$' Radial axis of driver FIG. 4
22$_2$' Radial axis of driver FIG. 4
22$_1$" Radial axis of tooling FIG. 11
22$_2$" Radial axis of tooling FIG. 11
23 second outer wall of fastener FIG. 3
23' second outer wall of driver FIG. 4
23" second outer wall of tooling FIG. 11
23$_4$ second outer wall of fastener FIG. 6
24 proximal end of second outer wall S of fastener FIG. 3
24' proximal end of second outer wall S of driver FIG. 4
24" proximal end of second outer wall S of tooling FIG. 11
25 distal and of 2nd outer wall S of fastener FIG. 3
25' distal end of 2nd outer wall S of driver FIG. 4
25" distal end of 2nd outer wall S of tooling FIG. 11
26 fastener bolt FIGS. 15, 16, 19
27 threads FIG. 15
28 head flange FIG. 15
29 driving head FIG. 15, 19
36 fastener nut FIGS. 17,18
37 internal threads FIGS. 17,18
38 head flange FIGS. 17,18

| | |
|---|---|
| 39 driving head FIGS. 17,18 | 322 Radial axial plane FIG. 20 |
| 41 coupling socket member FIG. 19 | 322' Radial axial plane FIG. 21 |
| 54 angle FIG. 6 | 323 second outer wall FIG. 20 |
| 55 angle FIG. 6 | 323' second outer wall FIG. 21 |
| 56' angle FIG. 7 | 324 proximal end of second outer wall FIG. 20 |
| 56 | 324' proximal end of second outer wall FIG. 21 |
| 57' angle FIG. 7 | 325 distal end FIG. 20 |
| 101 body FIG. 15 | 325' distal end FIG. 21 |
| 104 axis FIG. 15 | 401 body FIG. 22 |

39 driving head FIGS. 17,18
41 coupling socket member FIG. 19
54 angle FIG. 6
55 angle FIG. 6
56' angle FIG. 7
56
57' angle FIG. 7
101 body FIG. 15
104 axis FIG. 15
111 modified polygonal cross section FIG. 16
112 perimeter wall FIG. 16
113 polygonal central portion (square) FIG. 16
114 drive wall FIG. 16
115 proximal end FIG. 16
116 distal end FIG. 16
117 first outer wall FIG. 16
118 proximal end FIG. 16
119 angle FIG. 16
120 distal end FIG. 16
121 Not assigned
122 Radial axial plane FIG. 16
123 second outer wall FIG. 16
124 proximal end of second outer wall FIG. 16
125 distal end FIG. 16
201 body FIG. 17
204 axis FIG. 17
211 modified polygonal cross section FIG. 18
212 perimeter wall FIG. 18
213 polygonal central portion (square) FIG. 18
214 drive wall FIG. 18
215 proximal end FIG. 18
216 distal end FIG. 18
217 first outer wall FIG. 18
218 proximal end FIG. 18
219 angle FIG. 18
220 distal end FIG. 18
221 Not assigned
222 Radial axial plane, FIG. 18
223 second outer wall, FIG. 18
224 proximal end of second outer wall, FIG. 18
225 distal end, FIG. 18
301 body FIG. 19
301' body FIG. 19 (of driver)
304 axis FIG. 19
307 recess FIG. 19
307' recess FIG. 19
311 modified polygonal cross section FIG. 20
311 ' modified polygonal cross section FIG. 21
312 perimeter wall FIG. 20
312' perimeter wall FIG. 21
313 polygonal central portion (square) FIG. 20
313' polygonal central portion (square) FIG. 19
314 drive wall FIG. 20
314' drive wall FIG. 21
315 proximal end FIG. 20
315' proximal end FIG. 21
316 distal end FIG. 20
316' distal end FIG. 21
317 first outer wall FIG. 20
317' first outer wall FIG. 21
318 proximal end FIG. 20
318' proximal end FIG. 21
319 angle FIG. 20
319' angle FIG. 21
320 distal end FIG. 20
320' distal end FIG. 21
321 Not assigned 322 Radial axial plane FIG. 20
322' Radial axial plane FIG. 21
323 second outer wall FIG. 20
323' second outer wall FIG. 21
324 proximal end of second outer wall FIG. 20
324' proximal end of second outer wall FIG. 21
325 distal end FIG. 20
325' distal end FIG. 21
401 body FIG. 22
404 axis of body 401 FIG. 22
$404_1$ axis of great circle 421 FIG. 22
407 recess FIG. 22
411 modified polygonal cross section FIG. 22
412 perimeter wall FIG. 22
413 polygonal central portion (square) FIG. 22
$413_1$ perimeter line of (polygonal central portion (square) 413
$413_2$ perimeter line of (polygonal central portion (square) 413
$413_3$ perimeter line of (polygonal central portion (square) 413
$413_4$ perimeter line of (polygonal central portion (square) 413
$414_1$ drive wall FIG. 22
$414_2$ drive wall FIG. 22
$414_3$ drive wall FIG. 22
$414_4$ drive wall FIG. 22
415 proximal end of drive wall FIG. 22
416 distal end of drive wall FIG. 22
417 first outer wall FIG. 22
418 proximal end of first outer wall FIG. 22
419 angle FIG. 22
420 distal end of first outer wall FIG. 22
421 great circle FIG. 22
$422_1$ Radial axial plane FIG. 22
$422_2$ radial axial plane FIG. 22
423 second outer wall FIG. 22
424 proximal end of second outer wall FIG. 22
425 distal end of second outer wall FIG. 22
426 force arrow FIG. 22
427 force arrow FIG. 22
428 force arrow FIG. 22
429 radial axial plane FIG. 22
430 force arrow FIG. 22
431 force arrow FIG. 22
432 force arrow FIG. 22
433 radial axial plane FIG. 22
501 body FIG. 23
504 axis of body and great circle 421 FIG. 23
507 recess FIG. 23
509 force arrow FIG. 23
511 modified polygonal cross section FIG. 23
512 perimeter wall FIG. 23
513 polygonal central portion (square) FIG. 23
$513_1$ perimeter line of (polygonal central portion (square) 513 FIG. 23
$513_2$ perimeter line of (polygonal central portion (square) 513 FIG. 23
$513_3$ perimeter line of (polygonal central portion (square) 513 FIG. 23
$513_4$ perimeter line of (polygonal central portion (square) 513 FIG. 23
$514_1$ drive wall FIG. 23
$514_2$ drive wall FIG. 23
$514_3$ drive wall FIG. 23
$514_4$ drive wall FIG. 23
515 proximal end of drive wall FIG. 23

516 distal end of drive wall FIG. 23
517 first outer wall FIG. 23
518 proximal end of first outer wall FIG. 23
520 distal end of first outer wall FIG. 23
521 great circle FIG. 23
$522_1$ radial axial plane FIG. 23
$522_2$ radial axial plane FIG. 23
523 2nd outer wall FIG. 23
524 proximal end of 2nd outer wall FIG. 23
525 distal end of second outer wall FIG. 23
530 force arrow FIG. 23
531 force arrow FIG. 23
532 force arrow FIG. 23
533 radial axial plane FIG. 23
534 RADIAL AXIAL PLANE FIG. 23
535 angle FIG. 23
601 body FIG. 25
604 axis of body and great circle 421 FIG. 25
607 recess FIG. 25
611 modified polygonal cross section FIG. 25
612 perimeter wall FIG. 25
613 polygonal central portion (square) FIG. 25
$613_1$ perimeter line of (polygonal central portion (square) 413
$613_2$ perimeter line of (polygonal central portion (square) 413
$613_3$ perimeter line of (polygonal central portion (square) 413
$613_4$ perimeter line of (polygonal central portion (square) 413
$614_1$ drive wall FIG. 25
$614_2$ drive wall FIG. 25
$614_3$ drive wall FIG. 25
$614_4$ drive wall FIG. 25
615 proximal end of drive wall FIG. 25
616 distal end of drive wall FIG. 25
617 first outer wall FIG. 25
618 proximal end of first outer wall FIG. 25
620 distal end of first outer wall FIG. 25
612 great circle FIG. 25
$622_1$ Radial axial plane FIG. 25
$622_2$ Radial axial plane FIG. 25
623 second outer wall FIG. 25
624 proximal end of second outer wall FIG. 25
625 distal end of second outer wall FIG. 25
701 body FIG. 26
704 axis of body and great circle 421 FIG. 26
707 recess FIG. 26
711 modified polygonal cross section FIG. 26
712 perimeter wall FIG. 26
713 polygonal central portion (square) FIG. 26
$713_1$ perimeter line of (polygonal central portion (square) 413
$713_2$ perimeter line of (polygonal central portion (square) 413
$713_3$ perimeter line of (polygonal central portion (square) 413
$713_4$ perimeter line of (polygonal central portion (square) 413
$714_1$ drive wall FIG. 26
$714_2$ drive wall FIG. 26
$714_3$ drive wall FIG. 26
$714_4$ drive wall FIG. 26
715 proximal end of drive wall FIG. 26
716 distal end of drive wall FIG. 26
717 first outer wall FIG. 26
718 proximal end of first outer wall FIG. 26
720 distal end of first outer wall FIG. 26
721 great circle FIG. 26
$722_1$ Radial axial plane FIG. 26
$722_2$ Radial axial plane FIG. 26
723 second outer wall FIG. 26
724 proximal end of second outer wall FIG. 26
725 distal end of second outer wall FIG. 26
$745_1$ angle 5°
$745_2$ angle 5°
$745_3$ angle 5°
$745_4$ angle 5°
801 body FIG. 24
804 axis of body FIG. 24
$804_1$ axis of great circle FIG. 24
807 recess FIG. 24
811 modified polygonal cross section FIG. 24
812 perimeter wall FIG. 24
813 polygonal central portion (square) FIG. 24
$813_1$ perimeter line of (polygonal central portion (square) 413
$813_2$ perimeter line of (polygonal central portion (square) 413
$813_3$ perimeter line of (polygonal central portion (square) 413
$813_4$ perimeter line of (polygonal central portion (square) 413
$814_1$ fourth drive wall FIG. 24
$814_2$ drive wall FIG. 24
$814_3$ drive wall FIG. 24
$814_4$ drive wall FIG. 24
815 proximal end of drive wall FIG. 24
816 distal end of drive wall FIG. 24
817 first outer wall FIG. 24
818 proximal end of first outer wall FIG. 24
819 angle FIG. 24
820 distal end of first outer wall FIG. 24
821 great circle FIG. 24
$822_1$ Radial axial plane FIG. 24
$822_2$ radial axial plane FIG. 24
823 second outer wall FIG. 24
824 proximal end of second outer wall FIG. 24
825 distal end of second outer wall FIG. 24
826 force arrow FIG. 24
827 force arrow FIG. 24
828 force arrow FIG. 24
829 radial axial plane FIG. 24
830 force arrow FIG. 24
831 force arrow FIG. 24
832 force arrow FIG. 24
833 radial axial plane FIG. 24
846 third outer wall FIG. 24
847 proximal end of 846 FIG. 24
848 distal end of 846 FIG. 24
848 fourth outer wall FIG. 24
850 proximal end of 849 FIG. 24
851 distal end of 849 FIG. 24
852 proximal end of $814_4$
853 distal end of $814_4$

I claim:

1. A device for use in a torque transmitting system including a driver or the fabrication of components for such a system comprising:
   a. a body including an axis;
   b. said body having an outer polygonal cross section defined by a perimeter wall;
   c. an inner polygonal central portion positioned within said perimeter wall and having an area less than the area of said outer polygonal cross section;

d. a drive wall forming a portion of said perimeter wall extending on a plane from a proximal end outwardly from said polygonal central portion to a distal end;

e. a first outer wall forming another portion of said perimeter wall and having a proximal end joining the distal end of said drive wall at an angle and a distal end terminating on said perimeter wall; and f. at least a portion of said perimeter wall tapers inwardly in an axial direction in close registration with a matching similarly tapering wall on said perimeter of said driver.

2. A device according to claim 1 wherein:

a. said polygonal central portion is formed with a symmetrical configuration.

3. A device according to claim 1 wherein:

a. said polygonal central portion is a square.

4. A device according to claim 1 wherein:

a. said drive wall is on a plane generally on a radial axis of said axis of said body.

5. A device according to claim 4 wherein:

a. said perimeter wall comprises a plurality of drive walls each on a radially axial plane;

b. said perimeter wall comprising a plurality of said first outer walls with each proximal end respectively joining the distal ends of said plurality of drive walls and c. a plurality of second outer walls having proximal ends respectively joined to each of said distal ends of said first outer walls and having distal ends respectively joined to the proximal ends of each of said successive driver walls.

6. A device according to claim 1 wherein:

a. said perimeter wall includes four drive walls and four first outer walls.

7. A device according to claim 1 wherein:

a. said perimeter wall forms an asymmetrical geometric configuration.

8. A device according to claim 1 wherein:

a. said portion of said perimeter wall which tapers is a wall other than said driver wall;

b. said drive wall is on a plane substantially parallel to said axis of said fastener.

9. A device according to claim 1 wherein all portions of said perimeter wall are tapered except said driver walls which are on a plane vertical to said axis of said fastener.

10. A device as described in claim 1 wherein:

a. said substantially non-driving portion of said perimeter wall of said fastener and said registering driver have an area substantially greater than said drive walls of said fastener and said registering driver.

11. A device according to claim 1 wherein:

a. said device is a screw fastener for engaging a correspondingly shaped drive tool.

12. A device according to claim 1 wherein:

a. said device is a drive tool for engaging a correspondingly shaped fastener.

13. A device according to claim 1 wherein:

a. said device is a forming tool for forming a recess in a screw fastener body and having a perimeter wall configuration as defined.

14. A device according to claim 1 wherein:

a. said device is a fastener having a driving head thereon, which driving head has an external configuration within which said perimeter wall is contained.

15. A device according to claim 1 wherein:

a. said device is a threaded nut for a bolt having an external configuration within which said perimeter wall is contained.

16. A device according to claim 1 for coupling with a driver at one end and coupling at the other end with a fastener having an externally configured driving head wherein:

a. said device is a coupling socket member having a pair of oppositely, but axially positioned recesses in which one of said recesses couples with said driver and the other recess couples with said driving head of said fastener.

17. A device according to claim 1 wherein:

a. said distal end of said drive wall and said distal end of said first outer wall lie generally on a common great circle whose axis is coincident with said axis of said body; and b. said drive wall is substantially parallel to an axis bisecting the adjacent wall of said polygonal central section.

18. A device according to claim 17 comprising:

a. a plurality of second outer walls having proximal ends respectively joined to each of said distal ends of said first outer walls and having distal ends respectively joined to the proximal ends of each of said successive drive walls; and b. said first outer wall is substantially longer than said second outer wall.

19. A device according to claim 1 comprising:

a. said distal end of said drive wall and said distal end of said first outer wall lie generally on a common great circle whose axis is coincident with said axis of said body;

b. said drive wall is on a plane generally on a radial axis of said axis of said body;

c. a plurality of second outer walls having proximal ends respectively joined to each of said distal ends of said first outer walls and having distal ends respectively joined to the proximal ends of each of said successive drive walls; and d. said first outer wall is substantially longer than said second outer wall.

20. A device according to claim 1 comprising:

a. said distal end of said drive wall and said distal end of said first outer wall lie generally on a great circle whose axis is coincident with said axis of said body; and b. said drive wall is on a plane generally on a radial axis of said axis of said body.

21. A device according to claim 1 wherein:

a. said drive wall is canted at an angle of approximately 5° in a clock wise direction from an axis bisecting the adjacent wall of said polygonal central portion.

22. A device according to claim 1 wherein:

a. said perimeter wall is symmetrical about said axis providing substantially equal bidirectional torque transmitting force.

23. A device according to claim 1 comprising:

a. said distal end of said drive wall and said distal end of said first outer wall lie generally on a common great circle whose axis is coincident with said axis of said body;

b. said drive wall is substantially parallel to an axis bisecting the adjacent wall of said polygonal central section;

c. a second outer wall having a proximal end joining the distal end of said first outer wall and having a distal end; and d. said second outer wall is substantially parallel to said drive wall.

24. A device according to claim 23 comprising:

a. a third outer wall having a proximal end joining said distal end of said second outer wall and a distal end lying generally on said common great circle;

b. a fourth outer wall having a proximal end joining said distal end of said third outer wall and a distal end;

c. a fourth drive wall having a proximal end joining said distal end of said fourth outer wall and a distal end lying on said great circle; and d. said fourth drive wall is substantially parallel to an axis bisecting the adjacent wall of said polygonal central portion.

* * * * *